United States Patent
Nemoto

(10) Patent No.: US 9,836,964 B2
(45) Date of Patent: Dec. 5, 2017

(54) VEHICLE IDENTIFICATION SYSTEM AND VEHICLE IDENTIFICATION DEVICE

(75) Inventor: Yusuke Nemoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 14/125,376

(22) PCT Filed: Jul. 26, 2011

(86) PCT No.: PCT/JP2011/067003
§ 371 (c)(1),
(2), (4) Date: Dec. 11, 2013

(87) PCT Pub. No.: WO2013/014755
PCT Pub. Date: Jan. 31, 2013

(65) Prior Publication Data
US 2014/0292545 A1    Oct. 2, 2014

(51) Int. Cl.
*G08G 1/123* (2006.01)
*G08G 1/017* (2006.01)
*G08G 1/16* (2006.01)
*B60W 30/16* (2012.01)
*G08G 1/00* (2006.01)
*B60K 31/00* (2006.01)
*G01S 13/93* (2006.01)

(52) U.S. Cl.
CPC .......... *G08G 1/017* (2013.01); *B60W 30/162* (2013.01); *G08G 1/163* (2013.01); *G08G 1/22* (2013.01);
(Continued)

(58) Field of Classification Search
CPC .......... G08G 1/205; G08G 1/017; G08G 1/22; G08G 1/163; B60W 2550/408
(Continued)

(56) References Cited

U.S. PATENT DOCUMENTS 6,169,497 B1 * 1/2001 Robert .................. G08G 1/127
340/988
7,274,988 B2 * 9/2007 Mukaiyama .................. 701/301
(Continued)

FOREIGN PATENT DOCUMENTS

| CN | 102077259 A | 5/2011 |
| JP | A-11-213299 | 8/1999 |

(Continued)

*Primary Examiner* — Toan N Pham
(74) *Attorney, Agent, or Firm* — Oliff PLC

(57) ABSTRACT

A vehicle identification system includes a communication device receiving other vehicle information related to other vehicle around a host vehicle, a detection device detecting other vehicle around the host vehicle, and a vehicle identification device identifying a vehicle transmitting the other vehicle information on the basis of the other vehicle information received by the communication device and the detection device, wherein the vehicle identification device is switching between a capturing mode capturing the transmitting vehicle on the basis of the other vehicle information received by the communication device and the detection device, and a tracking mode identifying the transmitting vehicle on the basis of a positional relation between the host vehicle and the transmitting vehicle at the time of the capturing mode, and motion information related to the transmitting vehicle based on the other vehicle information received by the communication device, after the capturing mode.

14 Claims, 10 Drawing Sheets

(52) U.S. Cl.
CPC ............... *B60K 2031/0016* (2013.01); *B60K 2031/0033* (2013.01); *B60W 30/16* (2013.01); *B60W 2550/302* (2013.01); *B60W 2550/306* (2013.01); *B60W 2550/308* (2013.01); *B60W 2550/402* (2013.01); *B60W 2550/408* (2013.01); *B60W 2750/302* (2013.01); *B60W 2750/306* (2013.01); *G01S 2013/936* (2013.01); *G01S 2013/9325* (2013.01); *G08G 1/166* (2013.01)

(58) Field of Classification Search
USPC ...................... 340/905, 936, 988; 701/301
See application file for complete search history.

(56) References Cited

U.S. PATENT DOCUMENTS

| | | | | |
|---|---|---|---|---|
| 9,002,631 | B2* | 4/2015 | Taguchi | 701/301 |
| 2011/0301779 | A1 | 12/2011 | Shida | |
| 2012/0148102 | A1* | 6/2012 | Moriguchi | G06T 7/208 |
| | | | | 382/103 |

FOREIGN PATENT DOCUMENTS

| | | |
|---|---|---|
| JP | A-2001-1791 | 1/2001 |
| JP | A-2004-347471 | 12/2004 |
| JP | 2007-280060 A | 10/2007 |
| JP | A-2008-46873 | 2/2008 |
| JP | A-2010-86269 | 4/2010 |

* cited by examiner

VEHICLE IDENTIFICATION SYSTEM AND VEHICLE IDENTIFICATION DEVICE

TECHNICAL FIELD

The invention relates to a vehicle identification (ID) system and a vehicle ID device.

BACKGROUND ART

Heretofore, for example, a vehicle ID system that identifies other vehicle which performs communication to control a host vehicle is available. As such a conventional vehicle ID system, for example, Patent Document 1 discloses a vehicle ID device including onboard detection means for detecting other vehicle, mounted on a host vehicle, communication acquisition means for acquiring the information related to other vehicle by communication, and ID means for identifying the other vehicle detected by the onboard detection means with the other vehicle acquired by the communication acquisition means.

Patent Document 1: Japanese Patent Application Publication No. 2010-086269

SUMMARY OF THE INVENTION

The vehicle ID device described in the aforementioned Patent Document 1 identifies other vehicle on the basis of a degree of matching between the speed that is detected and the speed that is indicated by acquired seed information, a degree of matching between the size of the detected other vehicle and the size corresponding to a vehicle model indicated by acquired vehicle model information, a degree of matching between the position where the other vehicle is detected and a position indicated by acquired position information, and the like. However, there is a room for further improvement, for example, in the improvement of accuracy at the time of ID of a communication vehicle.

The invention has been made in view of the aforementioned circumstances, and an object of the invention is to provide a vehicle ID system capable of improving accuracy in ID of a communication vehicle.

In order to attain the aforementioned object, a vehicle ID system according to the invention includes: a communication device that receives other vehicle information related to other vehicle around a host vehicle; a detection device that detects other vehicle around the host vehicle; and a vehicle ID device that identifies a transmitting vehicle transmitting the other vehicle information on the basis of the other vehicle information received by the communication device and a result of detection by the detection device, wherein the vehicle ID device is capable of switching between a capturing mode for capturing the transmitting vehicle on the basis of the other vehicle information received by the communication device and the result of detection by the detection device, and a tracking mode for identifying the transmitting vehicle on the basis of a positional relation between the host vehicle and the transmitting vehicle at the time of capturing in the capturing mode, and motion information related to the transmitting vehicle based on the other vehicle information received by the communication device, after the capturing in the capturing mode.

In the aforementioned vehicle ID system, the vehicle ID device can capture the transmitting vehicle on the basis of absolute position information that is position information related to the transmitting vehicle based on the other vehicle information in the capturing mode, and identify, in the tracking mode, the transmitting vehicle on the basis of relative position information that is position information related to the transmitting vehicle based on a reference position that is a position of the transmitting vehicle at the time of capturing in the capturing mode, and the motion information related to the transmitting vehicle.

In the aforementioned vehicle ID system, the vehicle ID device can identify, in the tracking mode, the transmitting vehicle on the basis of the relative position information based on the relative position information related to the past in the tracking mode, and the motion information related to the transmitting vehicle.

In the aforementioned vehicle ID system, the vehicle ID device can return, in the tracking mode, to the capturing mode in accordance with a result of comparison between the motion information related to the transmitting vehicle based on the other vehicle information received by the communication device, and the result of detection by the detection device.

The aforementioned vehicle ID system can further include a traveling control device that controls deceleration of the host vehicle on the basis of deceleration of the other vehicle detected by the detection device, at the time of returning from the tracking mode to the capturing mode in accordance with the result of comparison.

In order to attain the aforementioned object, a vehicle ID device according to the invention is capable of switching between a capturing mode for capturing a transmitting vehicle of other vehicle information related to other vehicle around a host vehicle received by a communication device on the basis of the other vehicle information and a result of detection by a detection device that detects other vehicle around the host vehicle, and a tracking mode for identifying the transmitting vehicle on the basis of a positional relation between the host vehicle and the transmitting vehicle at the time of capturing in the capturing mode, and motion information related to the transmitting vehicle based on the other vehicle information received by the communication device, after the capturing in the capturing mode.

A vehicle ID system, and a vehicle ID device according to the invention produce effects that accuracy in ID of a communication vehicle can be improved.

MODES FOR CARRYING OUT THE INVENTION

Hereinafter, embodiments according to the invention will be described in detail with reference to the figures. Note that this invention is not limited to these embodiments. Additionally, components in the following embodiments include components easily replaceable by a person skilled in the art, or substantially identical components.

Embodiment 1

Figure 1:
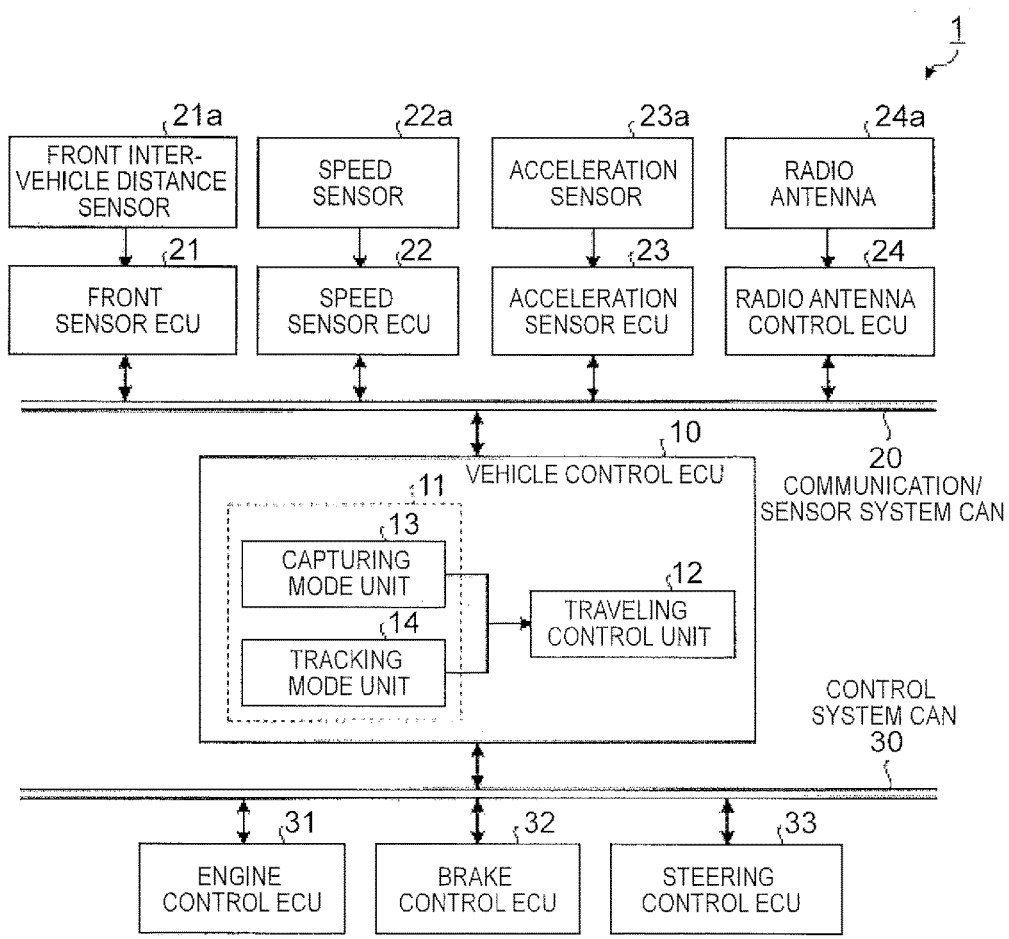
FIG. 1 is a schematic configuration diagram representing a vehicle control system according to Embodiment 1.
Figure 2:
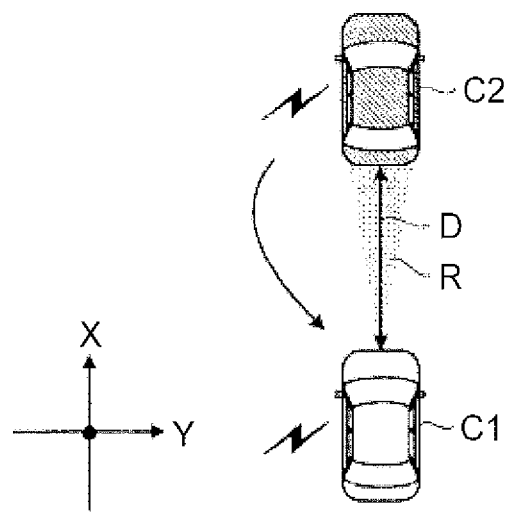
FIG. 2 is a schematic diagram illustrating the relation between a host vehicle and other vehicle in the vehicle control system according to Embodiment 1.
Figure 3:
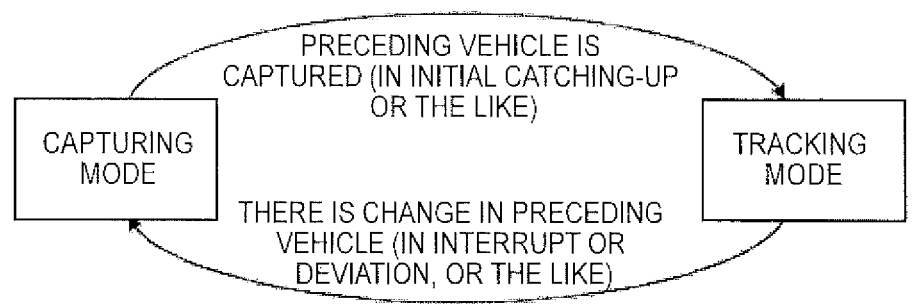
FIG. 3 is a schematic diagram illustrating an internal state of a vehicle control electronic control unit (ECU) according to Embodiment 1.
Figure 4:
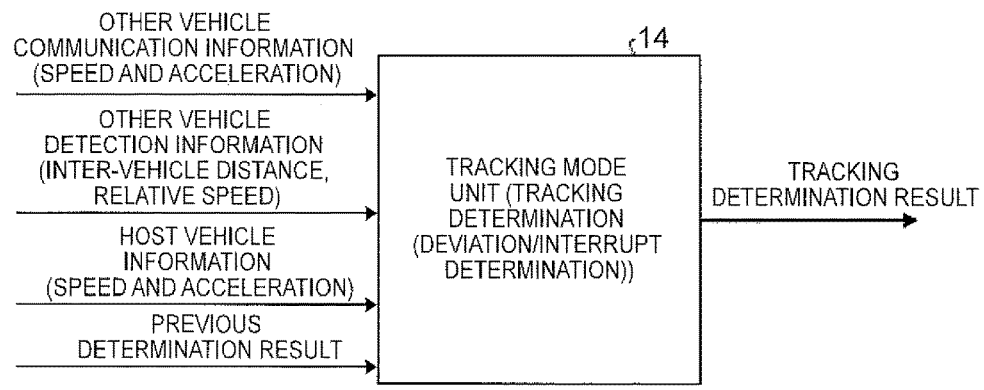
FIG. 4 is a schematic configuration diagram representing a tracking mode unit of the vehicle control ECU according to Embodiment 1.
Figure 5:
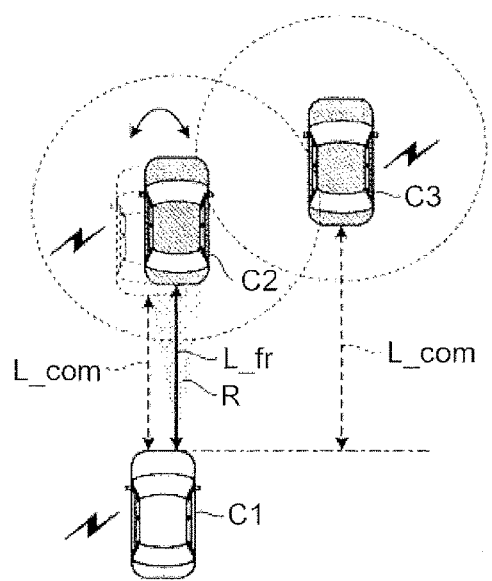
FIG. 5 is a schematic diagram illustrating tracking determination in a tracking mode in the vehicle control ECU according to Embodiment 1.
Figure 6:
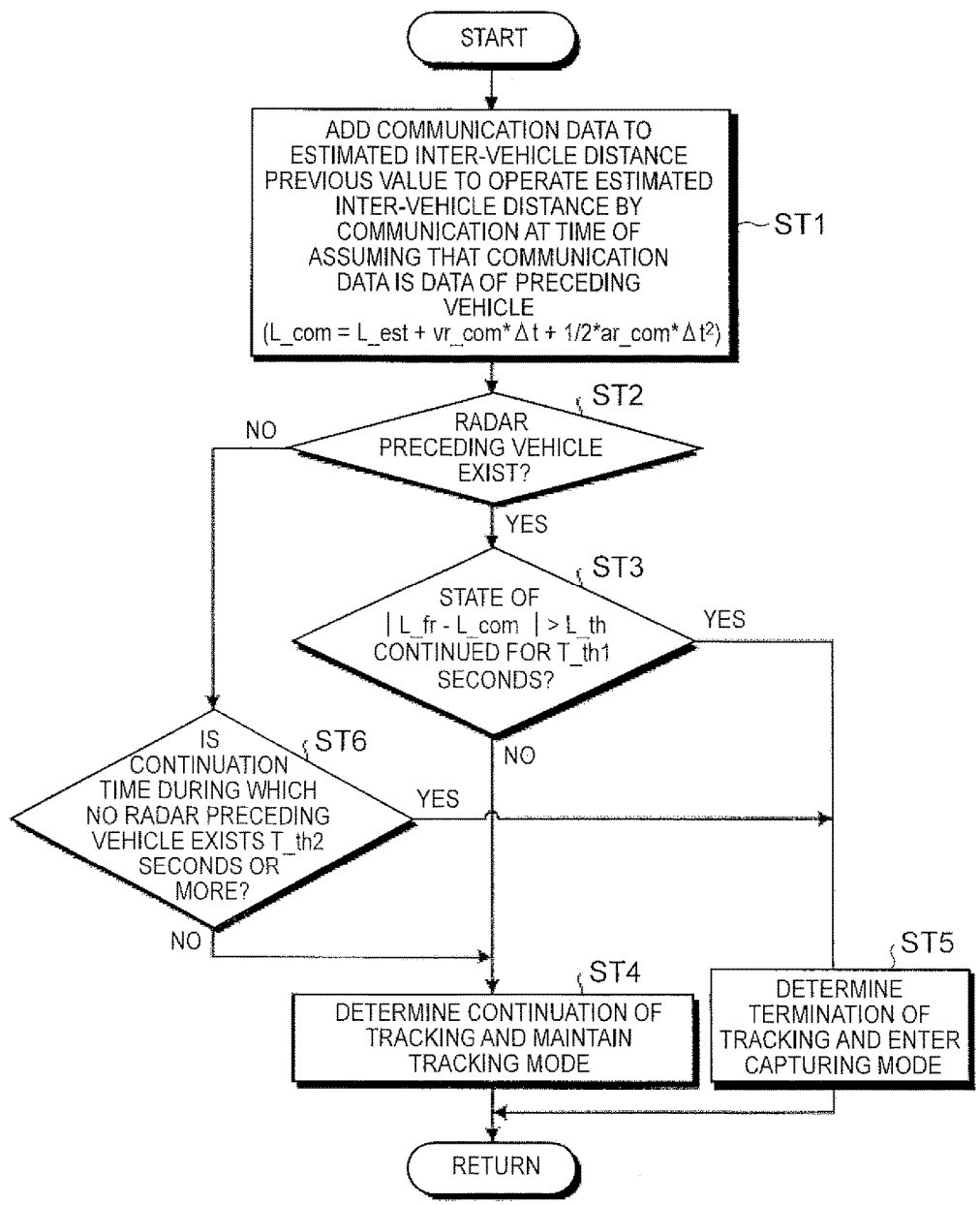
FIG. 6 is a flowchart illustrating an example of a tracking determination process in the tracking mode in the vehicle control ECU according to Embodiment 1.
Figure 7:
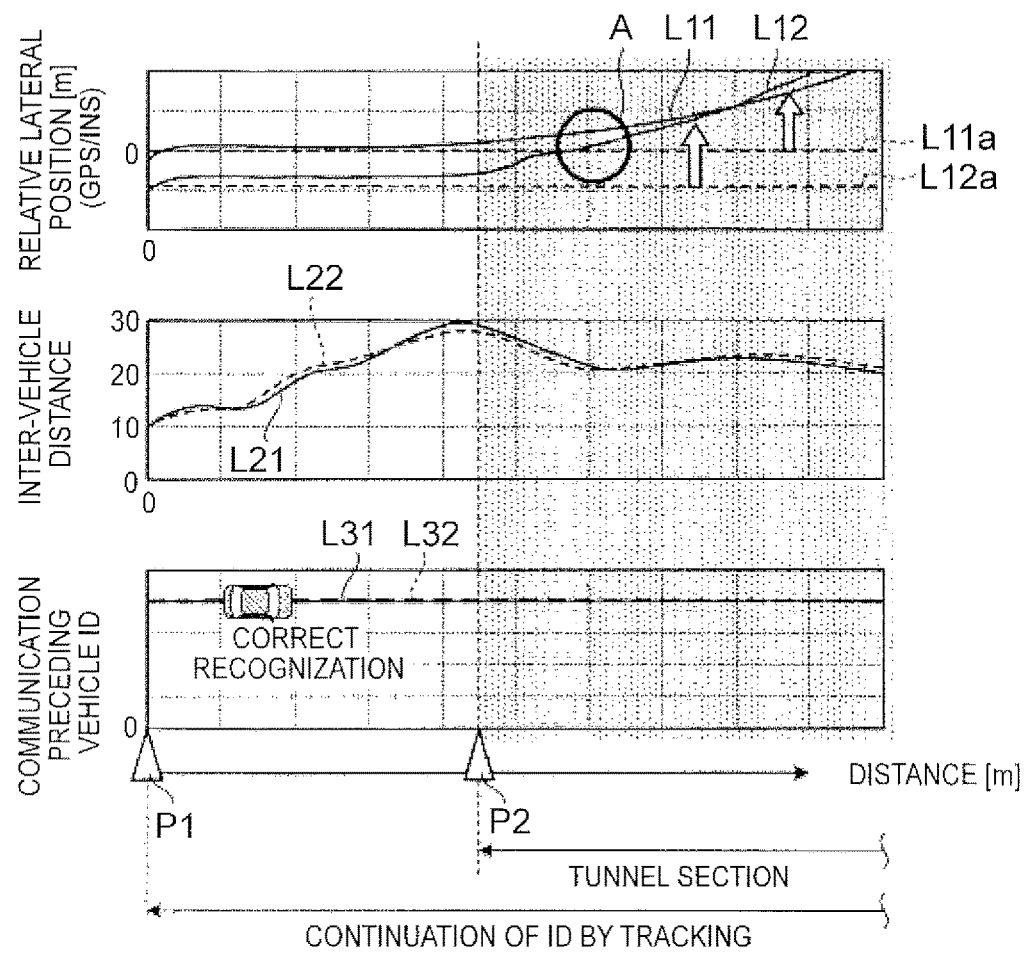
FIG. 7 is a diagrammatic graph illustrating the action of the vehicle control system according to Embodiment 1.
Figure 8:
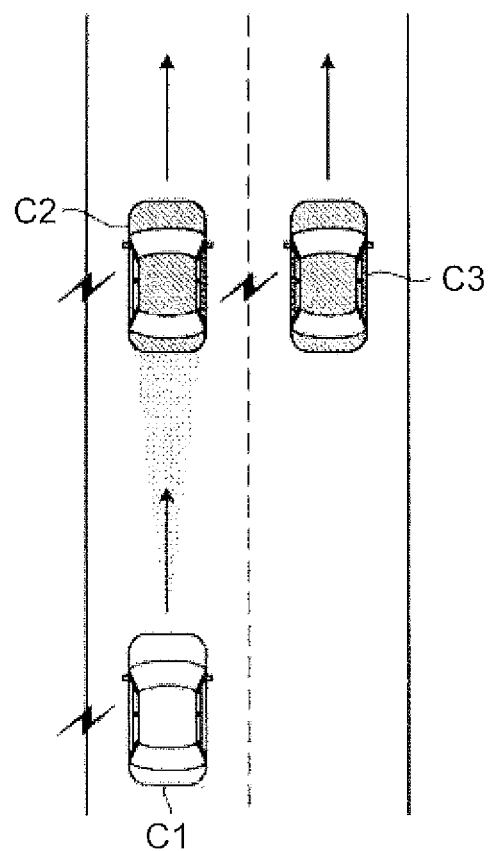
FIG. 8 is a schematic diagram illustrating the action of the vehicle control system according to Embodiment 1.

FIG. 1 is a schematic configuration diagram representing a vehicle control system according to Embodiment 1, FIG. 2 is a schematic diagram illustrating the relation between a host vehicle and other vehicle in the vehicle control system according to Embodiment 1, FIG. 3 is a schematic diagram illustrating an internal state of a vehicle control ECU according to Embodiment 1, FIG. 4 is a schematic configuration diagram representing a tracking mode unit of the vehicle control ECU according to Embodiment 1, FIG. 5 is a schematic diagram illustrating tracking determination in a tracking mode in the vehicle control ECU according to Embodiment 1, FIG. 6 is a flowchart illustrating an example of a tracking determination process in the tracking mode in the vehicle control ECU according to Embodiment 1, FIG. 7 is a diagram illustrating the action of the vehicle control system according to Embodiment 1, and FIG. 8 is a schematic diagram illustrating the action of the vehicle control system according to Embodiment 1.

A vehicle control system 1 serving as the vehicle ID system according to this embodiment, shown in FIG. 1, is applied to an adaptive cruise control (ACC) system that controls an inter-vehicle distance such that the inter-vehicle distance becomes a target inter-vehicle distance (or target inter-vehicle time) set by using radio communication such as so-called inter-vehicle communication. Components shown in FIG. 1 are mounted on a vehicle, thereby implementing the vehicle control system 1.

As shown in FIG. 2, the vehicle control system 1 transmits/receives various information between a host vehicle C1 and other vehicle C2 (e.g., a preceding vehicle or a following vehicle) that travels around the host vehicle C1, by utilizing a radio communication technology for a vehicle. Then, the vehicle control system 1 enables traveling control between the host vehicle C1 and the other vehicle C2 using the information related to these vehicles that is transmitted/received. The vehicle control system 1 sets control target values such as a target inter-vehicle distance and the like on the basis of follow-up control necessary information in the various information obtained from the other vehicle C2 in the host vehicle C1, to perform vehicle control according to the control target values. That is, the vehicle control system 1 performs information communication follow-up control on the basis of the information (communication data) of the other vehicle C2, which is received by radio communication. The vehicle control system 1 shortens an inter-vehicle distance D between the host vehicle C1 and the other vehicle C2 such that the inter-vehicle distance D becomes a target inter-vehicle distance, thereby, for example, enabling reduction in the air resistance of the following vehicle. Therefore, it is possible to improve the fuel consumption of the following vehicle. Additionally, the vehicle control system 1 shortens the inter-vehicle distance, thereby, for example, enabling increase in the number of passing vehicles (so-called traffic capacity) within a unit time at a certain point on a road. Therefore, this is helpful for reduction in traffic congestion.

The follow-up control (inter-vehicle control) of the vehicle control system 1, exemplified herein, is not limited to follow-up control between two vehicles performed when a vehicle travels following another preceding vehicle in front of the vehicle, or when a vehicle is followed by another following vehicle. The follow-up control of the vehicle control system 1 includes inter-vehicle, follow-up control performed when a plurality of vehicles forms a group of vehicle line (vehicle group) to travel in line while following a preceding vehicle or being followed by a following vehicle.

Specifically, as illustrated in FIG. 1, the vehicle control system 1 includes a vehicle control ECU 10 that is used as a vehicle ID device and a traveling control device, a front inter-vehicle distance sensor 21a and a front sensor ECU 21 that serve as a detection device, a speed sensor 22a and a speed sensor ECU 22, an acceleration sensor 23a and an acceleration sensor ECU 23, a radio antenna 24a and a radio antenna control ECU 24 that serve as a communication device, an engine control ECU 31, a brake control ECU 32, and a steering control ECU 33. The components of the vehicle control system 1 are exemplified to be mounted in common on the host vehicle, and the other vehicle around this host vehicle.

The vehicle control ECU 10 is a control unit that totally controls the entire vehicle control system 1, and, for example, is configured mainly as a computer including a central processing unit (CPU), a read only memory (ROM), and a random access memory (RAM). The vehicle control ECU 10 is a traveling control device that controls traveling of the host vehicle, and performs the aforementioned information communication follow-up control. The detailed function of the vehicle control ECU 10 will be described later.

The front inter-vehicle distance sensor 21a, the speed sensor 22a, the acceleration sensor 23a, and the like are autonomous sensors (on-vehicle equipment) for detecting a travel state of the host vehicle that is a vehicle mounted with the vehicle control system 1. The front inter-vehicle distance sensor 21a is electrically connected to the front sensor ECU 21. The speed sensor 22a is electrically connected to the speed sensor ECU 22. The acceleration sensor 23a is electrically connected to the acceleration sensor ECU 23. The front sensor ECU 21, the speed sensor ECU 22, and the acceleration sensor ECU 23 each process a signal acquired by the corresponding sensor. The front sensor ECU 21, the speed sensor ECU 22, and the acceleration sensor ECU 23 are connected to the vehicle control ECU 10 via a communication/sensor system CAN 20 constructed as an in-vehicle network.

The front inter-vehicle distance sensor 21a and the front sensor ECU 21 are a detection device for detecting other vehicle around the host vehicle, and detect a relative physical quantity that indicates the relative relation between the detected other vehicle and the host vehicle. Typically, the front inter-vehicle distance sensor 21a and the front sensor ECU 21 detect the other vehicle that travels ahead in front of the host vehicle (hereinafter, sometimes referred to as "preceding vehicle"). The front inter-vehicle distance sensor 21a and the front sensor ECU 21 detect a preceding vehicle in a predetermined detection range R (e.g., see FIG. 2) in front of the host vehicle, typically the preceding vehicle that travels immediately in front of the host vehicle. Herein, the front inter-vehicle distance sensor 21a and the front sensor ECU 21 have a function of detecting an inter-vehicle distance between the host vehicle and the other vehicle that travels immediately in front of the host vehicle, as the aforementioned relative physical quantity. This inter-vehicle distance between the host vehicle and the other vehicle that travels immediately in front of the host vehicle corresponds to a physical quantity that indicates the relative position of the other vehicle to the host vehicle (hereinafter, sometimes referred to as "relative position"). In addition, information that indicates the inter-vehicle distance between the host vehicle and the other vehicle corresponds to position information that indicates the position of the other vehicle to the host vehicle.

For the front inter-vehicle distance sensor 21a, for example, a millimeter wave radar or the like provided on the front part of the host vehicle, can be used. For example, the front inter-vehicle distance sensor 21a transmits so as to perform scanning in the right and left direction (vehicle width direction) with electromagnetic waves such as millimeter waves, and receives reflected waves reflected on an object. The front sensor ECU 21 computes an inter-vehicle distance as the aforementioned relative physical quantity on the basis of a time during which the front inter-vehicle distance sensor 21a transmits electromagnetic waves and receives the electromagnetic waves. Additionally, the front sensor ECU 21 can compute the relative speed, the relative acceleration, or the like of the host vehicle to the other vehicle that travels immediately in front of travel the host vehicle, as the aforementioned relative physical quantity, on the basis of a time during which the front inter-vehicle distance sensor 21a transmits electromagnetic waves and receives the electromagnetic waves, or an inter-vehicle distance or the like computed from the time. The front sensor ECU 21 outputs the relative physical quantities such as the computed inter-vehicle distance, relative speed and relative acceleration, to the vehicle control ECU 10 as other vehicle detection information. The inter-vehicle distance, the relative speed, the relative acceleration and the like detected by the front inter-vehicle distance sensor 21a and the front sensor ECU 21 include errors of noise, operation accuracy, measurement accuracy, and the like.

Herein, for the front inter-vehicle distance sensor 21a, a millimeter wave radar, or the like can be used. However, the front inter-vehicle distance sensor 21a is not limited to this. The front inter-vehicle distance sensor 21a may be, for example, a radar using lasers, infrared rays or the like, a radar for short distance such as an ultra wide band (UWB) radar, a sonar using sound waves in a audible range or ultrasonic waves, or an image recognition device that computes an inter-vehicle distance or the like by analyzing image data obtained by imaging the front of the host vehicle in the traveling direction by an imaging device such as a charge-coupled device (CCD) camera, or the like. The vehicle control system 1 may further includes a rear inter-vehicle distance sensor and a rear sensor ECU that detect a relative physical quantity indicating the relative relation between a following vehicle of a host vehicle and the host vehicle, as a detection device that detects other vehicle around the host vehicle.

The speed sensor 22a and the speed sensor ECU 22 have a function of detecting the speed of the host vehicle (hereinafter, sometimes referred to as "vehicle speed"). For the speed sensor 22a, for example, an electromagnetic pickup wheel speed sensor that detects the rotation of wheels of a host vehicle as a pulse signal, or the like can be used. For example, the speed sensor 22a outputs a pulse signal accompanying the rotation of the wheels to the speed sensor ECU 22. The speed sensor ECU 22 computes the speed of the host vehicle (or wheel speed) on the basis of the pulse signal detected by the speed sensor 22a. The speed sensor ECU 22 outputs the speed of the host vehicle to the vehicle control ECU 10 as speed information. The speed of the host vehicle detected by the speed sensor 22a and the speed sensor ECU 22 include errors of noise, operation accuracy, measurement accuracy, and the like.

The acceleration sensor 23a and the acceleration sensor ECU 23 have a function of detecting the acceleration of the host vehicle. For acceleration sensor 23a, for example, a gas rate sensor, a gyro sensor, or the like can be used. For example, the acceleration sensor 23a outputs a signal indicating displacement resulting from acceleration to the acceleration sensor ECU 23. The acceleration sensor ECU 23 computes the acceleration of the host vehicle on the basis of the signal. The acceleration sensor ECU 23 outputs the acceleration to the vehicle control ECU 10 as acceleration information. The acceleration detected by the acceleration sensor 23a and the acceleration sensor ECU 23 include errors of noise, operation accuracy, measurement accuracy, and the like.

As described above, the vehicle control system 1 is capable of acquiring the other vehicle detection information, speed information, and the acceleration information about the host vehicle, as the results of detection by the aforementioned various autonomous sensors mounted on the host vehicle.

The engine control ECU 31, the brake control ECU 32, and the steering control ECU 33 each perform a process regarding operation such as acceleration/deceleration, steering, and the like of the host vehicle. The engine control ECU 31, the brake control ECU 32, and the steering control ECU 33 are connected to the vehicle control ECU 10 via a control system CAN 30 as an in-vehicle network.

The engine control ECU 31 has a function of inputting acceleration request value information output from the vehicle control ECU 10, and operating a throttle actuator and the like with a manipulated variable corresponding to an acceleration request value indicating the acceleration request value information. The brake control ECU 32 has a function of inputting the aforementioned acceleration request value information, and operating a brake actuator and the like with the manipulated variable corresponding to the acceleration request value indicating the acceleration request value information. The steering control ECU 33 has a function of inputting steering command value information output from the vehicle control ECU 10, and operating a steering actuator and the like with a manipulated variable corresponding to a steering command value indicating the steering command value information. The acceleration request value information, and the steering command value information output from the vehicle control ECU 10 will be described later.

The radio antenna 24a and the radio antenna control ECU 24 are each a communication device that receives other vehicle communication information as other vehicle information related to other vehicle around the host vehicle, and transfer various information between the host vehicle and the other vehicle around the host vehicle. The radio antenna control ECU 24 is connected to the vehicle control ECU 10 via the communication/sensor system CAN 20.

For the radio antenna 24a and the radio antenna control ECU 24, for example, an inter-vehicle communication device that performs radio communication for vehicles can be used. The vehicle control system 1 of the host vehicle mutually performs inter-vehicle communication with the other vehicle around the host vehicle, by the radio antenna 24a and the radio antenna control ECU 24. Consequently, the vehicle control system 1 is capable of mutually transferring various information such as vehicle specification information regarding respective vehicles, the other vehicle detection information, speed information, the acceleration information, vehicle ID information (body ID information), the acceleration request value information, the steering command value information, and traveling environment information, as the other vehicle communication information.

Additionally, the radio, antenna 24a and the radio antenna control ECU 24 also have a function as a global positioning system (GPS) that detects a current position of a host vehicle. The radio antenna 24a and the radio antenna control ECU 24 receive a GPS signal output by a GPS satellite, to position and operate GPS information (latitude, longitude, and traveling direction) that is the position information related to the host vehicle, on the basis of the received GPS signal. The vehicle control system 1 of the host vehicle mutually performs inter-vehicle communication with the other vehicle around the host vehicle, by the radio antenna 24a and the radio antenna control ECU 24, and the GPS information can be also mutually transferred as the other vehicle communication information. As error factors of the GPS position, an effect of ionosphere, an effect of vapor, an effect of air pressure, an effect of satellite location, an effect of a high-voltage transmission line, an effect of thunder, a multipath and the like are conceivable. The error of the positioning by the GPS tends to relatively become larger, for example, under the environment such as an urban area where multipaths or tunnels that block radio waves of a GPS frequently appear.

Herein, the inter-vehicle communication device or the like is used for the radio antenna 24a and the radio antenna control ECU 24. However the radio antenna 24a and the radio antenna control ECU 24 are not limited to this. The radio antenna 24a and the radio antenna control ECU 24 may be a road-vehicle communication device that allows vehicles to exchange information via a communication facility (roadside machine such as a optical beacon) constructed outside the vehicles. Additionally, the radio antenna 24a and the radio antenna control ECU 24 may be a device that allows vehicles to exchange information by utilizing communication infrastructure such the Internet via a communication facility (base station such as an information center) constructed outside the vehicles. A GPS device may be configured independently from the radio antenna 24a and the radio antenna control ECU 24, for example, like a so-called navigation device.

The vehicle control ECU 10 has a function of autonomously controlling an inter-vehicle distance between the host vehicle and the other vehicle on the basis of the speed information related to the host vehicle, the acceleration information related to the host vehicle, and the other vehicle detection information (the inter-vehicle distance between the host vehicle and the other vehicle, the relative speed, the relative acceleration, and the like) which are obtained by the aforementioned various autonomous sensors of the host vehicle, and the other vehicle communication information (communication data) obtained by communication via the radio antenna 24a and the radio antenna control ECU 24. For example, the vehicle control ECU 10 has a function of generating the acceleration request value information, the steering command value information, and the like on the basis of the aforementioned various information related to the host vehicle and the other vehicle such that the inter-vehicle distance (inter-vehicle time) becomes a target inter-vehicle distance (target inter-vehicle time).

This target inter-vehicle distance is set by the vehicle control ECU 10 on the basis of an estimated value of the inter-vehicle distance while considering performance of each vehicle and a traveling environment. The vehicle control ECU 10 sets a target inter-vehicle distance on the basis of a current relative speed, a current relative inter-vehicle distance, and a current relative vehicle acceleration between vehicles such that the inter-vehicle distance does not become zero, for example, even when a preceding vehicle that travels immediately in front of a host vehicle carries out sudden braking or the like. Then, the vehicle control ECU 10, for example, sets a target vehicle speed, a target vehicle acceleration (target vehicle deceleration), a target jerk, and the like as actual control target values for the host vehicle which enable implementation of the target inter-vehicle distance, on the basis of the target inter-vehicle distance, and generates acceleration request value information, and steering command value information and the like in accordance with the target vehicle speed, the target vehicle acceleration (target vehicle deceleration), the target jerk, and the like.

Then, the vehicle control ECU 10 totally controls the respective units of the host vehicle on the basis of the acceleration request value information, the steering command value information (i.e., the target vehicle speed, the target vehicle acceleration (target vehicle deceleration), the target jerk, and the like) such that the inter-vehicle distance is converged to the target inter-vehicle distance. Consequently, the vehicle control ECU 10 performs information communication follow-up control utilizing a communication function.

As a result, the vehicle control system 1 can cause the host vehicle to follow the preceding vehicle that travels immediately in front of the host vehicle, maintain the inter-vehicle distance between the host vehicle and the preceding vehicle to a suitable inter-vehicle distance, thereby resulting in, for example, improvement of fuel consumption or reduction in traffic congestion.

Herein, the vehicle control system 1 of this embodiment is also a system for continuously identifying a communication vehicle (transmitting vehicle of the other vehicle communication information) being other vehicle that communicates with the host vehicle on the basis of the other vehicle detection information and the other vehicle communication information, during the information communication follow-up control. The vehicle control system 1 basically reliably recognizes that a preceding vehicle which travels immediately in front of the host vehicle is a follow-up control target vehicle, that is, reliably recognizes that the preceding vehicle which travels immediately in front of the host vehicle is a communication vehicle which communicates with the host vehicle, and thereafter performs follow-up control such that the host vehicle follows the communication vehicle. When the vehicle control system 1 performs the follow-up control, a lot of vehicles that do not communicate with the host vehicle coexist, and therefore the vehicle control system 1 confirms whether or not the preceding vehicle detected by the front inter-vehicle distance sensor 21*a* and the like is actually the communication vehicle that performs radio communication with the host vehicle, to identify the preceding vehicle.

The vehicle control ECU 10 also functions as a vehicle ID device that identifies the communication vehicle that is the transmitting vehicle of the other vehicle communication information, on the basis of the other vehicle communication information received by the radio antenna 24*a* and the radio antenna control ECU 24, and the other vehicle detection information that is the result of detection by the front inter-vehicle distance sensor 21*a* and the front sensor ECU 21.

As shown in FIG. 3, the vehicle control ECU 10 of this embodiment has a capturing mode and a tracking mode as modes for identifying a communication vehicle, and is capable of automatically switching these modes in accordance with the situation, thereby improving the accuracy in ID of the communication vehicle. That is, the vehicle control ECU 10 has two internal states of the capturing mode and the tracking mode when identifying the communication vehicle. Typically, the vehicle control ECU 10 identifies the communication vehicle by using the motion information related to the other vehicle, which is obtained by communication, at the time of the tracking mode, thereby improving environment resistance to secure so-called robustness. For example, the vehicle control ECU 10 is in the capturing mode in a state where a communication preceding vehicle being the preceding vehicle that communicates with the host vehicle does not exist, and when capturing the communication preceding vehicle in the capturing mode at the time of initial catching-up or the like, the vehicle control ECU 10 enters the tracking mode. Additionally, in the tracking mode, when the preceding vehicle that travels immediately in front of the host vehicle is changed by interrupt or deviation from a vehicle line, the vehicle control ECU 10 enters the capturing mode again. That is, the vehicle control ECU 10 switches a process of identifying the communication vehicle between when the vehicle control ECU 10 initially finds the communication preceding vehicle and when the vehicle control ECU 10 thereafter continues to follow the captured communication preceding vehicle.

Specifically, as illustrated in FIG. 1, in a functionally conceptual manner, the vehicle control ECU 10 is provided with a vehicle ID unit 11 and a traveling control unit 12. The vehicle ID unit 11 identifies the communication vehicle (transmitting vehicle) on the basis of the other vehicle communication information and the other vehicle detection information, and includes a capturing mode unit 13 and a tracking mode unit 14. The traveling control unit 12 performs information communication follow-up control so as to cause the host vehicle to follow the communication vehicle identified by the vehicle ID unit 11.

The capturing mode unit 13 implements the capturing mode. The capturing mode unit 13 captures the transmitting vehicle on the basis of the other vehicle communication information received by the radio antenna 24*a* and the radio antenna control ECU 24 and the other vehicle detection information that is the result of detection by the front inter-vehicle distance sensor 21*a* and the front sensor ECU 21, as the capturing mode. The capturing mode unit 13 acquires the other vehicle detection information, the other vehicle communication information, and the like from the front sensor ECU 21, the radio antenna control ECU 24 and the like via the communication/sensor system CAN 20. The capturing mode unit 13 simply captures a communication (preceding) vehicle that travels in front of the host vehicle, on the basis of the other vehicle communication information and the other vehicle detection information, by using various methods.

The capturing mode unit 13 of this embodiment captures the communication vehicle on the basis of absolute position information based on the other vehicle communication information. Herein, the absolute position information is position information for the other vehicle based on the other vehicle communication information. Typically, the absolute position information is position information indicating an absolute position of the other vehicle, which is not based on past position information related to the other vehicle, the position information serving as the standard, or the like, for example, position information based on the GPS information related to the other vehicle. For example, the capturing mode unit 13 is capable of capturing a preceding communication vehicle on the basis of the inter-vehicle distance between the host vehicle and the other vehicle, which is based on the other vehicle detection information, and the GPS information related to the other vehicle, which is based on the other vehicle communication information.

For example, when the front inter-vehicle distance sensor 21*a* captures a preceding vehicle, the capturing mode unit 13 acquires host vehicle GPS information that is the absolute position information related to the host vehicle, and other vehicle GPS information that is the absolute position information related to the preceding vehicle by communication. The capturing mode unit 13 obtains a difference between position coordinates indicated by the host vehicle GPS information and position coordinates indicated by the other vehicle GPS information, to perform coordinate transformation to coordinate system (see FIG. 2) having the direction, in which the host vehicle travels, as a reference, thereby computing a relative distance between an X coordinate direction (traveling direction) and a Y coordinate direction (vehicle width direction horizontally orthogonal to the direction in which the host vehicle travels) of the preceding vehicle with respect to the host vehicle. Then, the capturing mode unit 13 compares a relative distance between the host vehicle and the preceding vehicle, which is based on the host vehicle GPS information (host vehicle information) and the other vehicle GPS information (other vehicle communication information), with an inter-vehicle distance between the host vehicle and the preceding vehicle, which is based on the other vehicle detection information, to confirm a degree of matching of the relative distance and the inter-vehicle distance. The inter-vehicle distance between the host vehicle and the preceding vehicle, which is based on the other vehicle detection information, corresponds to an actual preceding vehicle observation value detected by the front inter-vehicle distance sensor 21*a* that is an autonomous sensor. In a case where a deviation between the relative distance based on the other vehicle communication information and the inter-vehicle distance based on the other vehicle detection information is a predetermined value that is preset or less, the capturing mode unit 13 is capable of recognizing that the preceding vehicle captured by the front inter-vehicle distance sensor 21*a* is a communication (preceding) vehicle which actually communicates with the host vehicle. Consequently, the capturing mode unit 13 is capable of capturing the communication vehicle. That is, the capturing mode unit 13 confirms a degree of matching between the position of the preceding vehicle, which is based on the other vehicle communication information, and the position of the preceding vehicle, which is based on the other vehicle detection information. Then, when the degree of matching is high, the capturing mode unit 13 recognizes that the preceding vehicle captured by the front inter-vehicle distance sensor 21*a* is the communication vehicle. When the degree of matching is low, the capturing mode unit 13 determines that the preceding vehicle is not the communication vehicle.

Herein, the capturing mode unit 13 captures the communication vehicle on the basis of the absolute position information based on the other vehicle GPS information or the like. However, the invention is not limited to this. For example, the capturing mode unit 13 computes time-series statistics of the speed of a preceding vehicle (or relative speed of the preceding vehicle to the host vehicle), which is based on the other vehicle communication information, and the speed of a preceding vehicle (or relative speed of the preceding vehicle to the host vehicle), which is based on the other vehicle detection information, by using a mean squared error or a correction coefficient, a differential integration value, or the like. Then, the capturing mode unit 13 determines on the basis of the time-series statistics whether or not the preceding vehicle captured by the front inter-vehicle distance sensor 21*a* is the communication vehicle that actually communicates with the host vehicle. As to a method of computing the time-series statistics, a method of computing time-series statistics in other embodiment described later can be applied, and therefore the detailed description thereof will be omitted.

The tracking mode unit 14 implements the tracking mode. The tracking mode unit 14 identifies the communication vehicle on the basis of the positional relation between the host vehicle and the communication vehicle at the time of capturing the communication vehicle in the capturing mode, and the motion information related to the communication vehicle, which is based on the other vehicle communication information received by the radio antenna 24*a* and the radio antenna control ECU 24, after the capturing in the capturing mode, as the tracking mode. That is, the tracking mode unit 14 identifies the communication vehicle on the basis of the positional relation between the host vehicle and the communication vehicle once captured in the capturing mode by the capturing mode unit 13, in the light of the motion information related to the communication vehicle, which is based on the other vehicle communication information. The tracking mode unit 14 acquires the other vehicle detection information, the other vehicle communication information, the host vehicle information and the like from the front sensor ECU 21, the speed sensor ECU 22, the acceleration sensor ECU 23, the radio antenna control ECU 24, and the like via the communication/sensor system CAN 20.

The tracking mode unit 14 of this embodiment identifies the transmitting vehicle on the basis of relative position information in the tracking mode. Herein, the relative position information is the position information related to the communication vehicle, which is based on the other vehicle communication information, and is the position information based on a reference position that is a position of the communication vehicle at the time of capturing in the capturing mode, and the motion information related to the communication vehicle. More specifically, the relative position information is relative position information formed by considering distance where the communication vehicle actually moves in accordance with the motion information related to the communication vehicle, with respect to the reference position that is the position of the communication vehicle at the time of capturing in the capturing mode.

The aforementioned motion information related to the communication vehicle is information regarding the speed and the acceleration of the communication vehicle, which is based on the other vehicle communication information. The motion information related to the communication vehicle is, for example, information with higher reliability than the GPS information having a large positioning error as described above. The tracking mode unit 14 identifies the communication vehicle by using the motion information related to the communication vehicle, thereby enabling improvement of the accuracy in ID of the communication vehicle. That is, the tracking mode unit 14 is capable of accurately estimating the positional relation between the host vehicle and the communication vehicle, typically, the inter-vehicle distance on the basis of the motion information related to the communication vehicle, which has relatively high reliability, as described below.

The tracking mode unit 14 uses a reference inter-vehicle distance of the communication vehicle as a physical quantity indicating the reference position that is the position of the communication vehicle with respect to the host vehicle at the time of capturing in the capturing mode. The reference inter-vehicle distance of the communication vehicle corresponds to a physical quantity indicating a relative positional relation between the host vehicle and the communication vehicle at the reference position of the communication vehicle at the time of capturing in the capturing mode. More specifically, the reference inter-vehicle distance of the communication vehicle corresponds to the relative distance between the communication vehicle and the host vehicle at the time of capturing in the capturing mode. That is, herein, the relative position information is position information that is formed by adding and subtracting the distance where the communication vehicle actually moves in accordance with the motion information related to the communication vehicle, with respect to the reference inter-vehicle according to the reference position of the communication vehicle, and indicates the relative distance between the communication vehicle and the host vehicle.

In the tracking mode, the tracking mode unit 14 of this embodiment identifies the communication vehicle on the basis of relative position information at an ID determining point (current point) based on past relative position information and the motion information related to the communication vehicle in the same ongoing tracking mode.

Herein, for example, the vehicle control ECU 10 repeatedly performs various control routines in a control period of several hundred μs or several ten ms. The relative position information at the ID determining point (current point) corresponds to position information indicating an estimated position where the communication vehicle is located, on the basis of the reference inter-vehicle distance and the motion information related to the communication vehicle, at the current point, namely, in a current control period. In a case where the ID determining point is the current control period, for the past relative position information, relative position information in a control period before at least one period, herein, in a previous control period can be typically used. The relative position information in the previous control period is information indicating a previous value of the relative distance between the communication vehicle and the host vehicle, which is based on the reference inter-vehicle distance and the motion information related to the communication vehicle. Each relative position information is obtained by accumulating the distance where the communication vehicle actually moves in accordance with the speed and the acceleration indicated by the motion information related to the communication vehicle, which is obtained in each control period, to the reference inter-vehicle distance according to the reference position of the communication vehicle. Accordingly, the past relative position information in the same ongoing tracking mode becomes a distance based on the same reference inter-vehicle distance.

The tracking mode unit 14 adds and subtracts the distance where the communication vehicle actually moves in accordance with the speed and the acceleration indicated by the motion information related to the communication vehicle in the current control period, with respect to a previous value of the relative distance between the communication vehicle and the host vehicle, which is based on the reference inter-vehicle distance indicated by the relative position information in the previous control period and the motion information related to the communication vehicle, thereby computing the relative position information at the ID determining point (current point). Consequently, the tracking mode unit 14 is capable of suppressing an operation amount, and suppressing an error to improve operation accuracy, compared to a case where the distance where the communication vehicle actually moves so far in each control period is added and subtracted with respect to the reference inter-vehicle distance, each time the communication vehicle moves.

Herein, the tracking mode unit 14 computes the relative position information at the ID determining point on the basis of the past relative position information, and the motion information related to the communication vehicle. However, the invention is not limited to this. The tracking mode unit 14 may compute the relative position information at the ID determining point (current point) by adding and subtracting the distance where the communication vehicle actually moves so far in each control period, with respect to the reference inter-vehicle distance, each time the communication vehicle moves.

More specifically, as illustrated in FIG. 4, the tracking mode unit 14 inputs the other vehicle communication information including the motion information related to the other vehicle which indicates the speed and the acceleration of the other vehicle, the other vehicle detection information indicating the inter-vehicle distance, and the relative speed between the host vehicle and the preceding vehicle, the host vehicle information indicating the speed and the acceleration of the host vehicle, and a previous determination result. The tracking mode unit 14 performs tracking determination (deviation/interrupt determination) on the basis of these other vehicle communication information, other vehicle detection information, host vehicle information, and previous determination result, to output a tracking determination result. In a case of determining that other vehicle captured by the front inter-vehicle distance sensor 21a and a communication vehicle that actually communicates with the host vehicle match as a result of the tracking determination, and determining that the tracking is continued, the tracking mode unit 14 maintains the tracking mode with no change. In a case where the tracking mode unit 14 determines that the other vehicle captured by the front inter-vehicle distance sensor 21a and the communication vehicle that actually communicates with the host vehicle are different as a result of the tracking determination, and determines that the tracking is terminated, the capturing mode unit 13 enters the capturing mode, to return to the capturing mode. That is, in a case where it is determined that the deviation/interrupt or the like occurs, the capturing mode unit 13 enters the capturing mode to return to the capturing mode.

The tracking mode unit 14 first computes a reference inter-vehicle distance of the communication vehicle, which is a physical quantity indicating a reference position being the position of the communication vehicle with respect to the host vehicle at the time of capturing in the capturing mode, as tracking determination (deviation/interrupt determination). The tracking mode unit 14 computes an estimated inter-vehicle distance between the host vehicle and the communication vehicle at the time of capturing in the capturing mode, as a reference inter-vehicle distance. The tracking mode unit 14 may use an actual observation value of the preceding vehicle, detected by the front inter-vehicle distance sensor 21a, when the communication preceding vehicle is captured in the capturing mode, namely, the inter-vehicle distance between the host vehicle and the preceding vehicle, which is based on the other vehicle detection information, as the reference inter-vehicle distance with no change. However, herein, in order to improve the accuracy in computation of the reference inter-vehicle distance, the tracking mode unit 14 computes the estimated inter-vehicle distance as described below to employ the same as the reference inter-vehicle distance.

That is, the tracking mode unit 14 computes the estimated inter-vehicle distance on the basis of the (relative) speed, and the acceleration of the host vehicle and the other vehicle, and the like, in addition to the inter-vehicle distance between the host vehicle and the preceding vehicle, which is based on the other vehicle detection information. Herein, the tracking mode unit 14 estimates the estimated inter-vehicle distance by using a so-called Kalman filter, thereby enabling accurate estimation of the estimated inter-vehicle distance between the host vehicle and the communication vehicle at the time of capturing in the capturing mode. The Kalman filter has a function of combining and fusing measurement values (observation values) of the inter-vehicle distance and the like, captured by the front inter-vehicle distance sensor 21a being an autonomous sensor, and vehicle motion (system) such as the speed, the acceleration, and the like of the host vehicle and the other vehicle, obtained by communication, and computing a motion state estimation value. This Kalman filter is an algorithm balancing a plurality of measurement values whose accuracy degrees are different, and an estimated value by a state equation describing vehicle motion, and estimating an optimum system state. More specifically, in a case where both of the measurement values and the estimated value include errors, the Kalman filter is an algorithm suitably weighing in accordance with the degree of these errors, and estimating the most reliable system state. The tracking mode unit 14 computes the estimated inter-vehicle distance as the motion state estimation value by using the Kalman filter, on the basis of the speed and the acceleration of the other vehicle, which is based on the other vehicle communication information, and the speed, the acceleration and the like of the host vehicle, which is based on the host vehicle information, in addition to the inter-vehicle distance between the host vehicle and the preceding vehicle based on the other vehicle detection information. Then, the tracking mode unit 14 employs the estimated inter-vehicle distance as the computed motion state estimation value as the reference inter-vehicle distance.

Consequently, the tracking mode unit 14 is capable of accurately computing the reference inter-vehicle distance of the communication vehicle while considering not only the measurement values obtained by the autonomous sensors provided in the host vehicle, but also the other vehicle information, e.g., the motion state thereof, acquired via communication. As a result, the tracking mode unit 14 is capable of performing a subsequent tracking determination process in the tracking mode, by using the accurately computed reference inter-vehicle distance.

Then, the tracking mode unit 14 computes the relative distance between the host vehicle and the other vehicle, on the basis of the reference inter-vehicle distance computed as described above, and the motion information related to the communication vehicle based on the other vehicle communication information. That is, the tracking mode unit 14 computes the relative distance obtained by adding and subtracting the distance where the communication vehicle actually moves in accordance with the motion information related to the communication vehicle obtained by communication, with respect to the reference inter-vehicle distance computed as described above, to employ the position information indicated by the computed relative distance as the relative position information.

For example, the tracking mode unit 14 computes an estimated inter-vehicle distance L_com based on the other vehicle communication information by using the following mathematical formula (1). This estimated inter-vehicle distance L_com based on the other vehicle communication information corresponds to the relative distance between the host vehicle and the other vehicle, which is obtained by adding and subtracting the distance where the communication vehicle actually moves in accordance with the motion information related to the communication vehicle, with respect to the reference inter-vehicle distance. The position information indicated by the estimated inter-vehicle distance L_com corresponds to relative position information used in the tracking mode.

[Math. 1]

$$L\_com = L\_est + vr\_com \times \Delta t + \frac{1}{2} \times ar\_com \times \Delta t^2 \qquad (1)$$

In the aforementioned mathematical formula (1), [L_com] denotes an estimated inter-vehicle distance based on the other vehicle communication information (hereinafter, sometimes referred to as "estimated inter-vehicle distance by communication"). [L_est] denotes an estimated inter-vehicle distance previous value, and [vr_com] denotes other vehicle speed based on the other vehicle communication information—host vehicle speed (hereinafter, sometimes referred to as "relative speed by communication"). [ar_com] denotes other vehicle acceleration based on the other vehicle communication information-host vehicle acceleration (hereinafter, sometimes referred to as "relative acceleration by communication"). "Δt" denotes a unit time according to a control period. Herein, the estimated inter-vehicle distance previous value [L_est] corresponds to the estimated inter-vehicle distance by communication [L_com] in a previous control period. In a case where the estimated inter-vehicle distance previous value [L_est] is a value in an initial control period in a tracking mode, a reference inter-vehicle distance between a host vehicle and a preceding vehicle at the time of capturing in a capturing mode is simply used with no change.

The tracking mode unit 14 compares the estimated inter-vehicle distance by communication L_com with the measured inter-vehicle distance L_fr based on the other vehicle detection information (hereinafter, "measured inter-vehicle distance by detection"), as tracking determination. Herein, the measured inter-vehicle distance by detection L_fr corresponds to a measurement value of an inter-vehicle distance between the host vehicle and the preceding vehicle, which is detected by the front inter-vehicle distance sensor 21a being a autonomous sensor, in the same control period.

As illustrated in FIG. 5, for example, in a case where a degree of matching between an estimated inter-vehicle distance by communication L_com from the other vehicle C2 that precedes the host vehicle C1, and a measured inter-vehicle distance by detection L_fr is relatively high, the tracking mode unit 14 is capable of identifying that the other vehicle C2 captured by the front inter-vehicle distance sensor 21a is the communication vehicle that actually communicates with the host vehicle C1. In this case, the tracking mode unit 14 determines that the tracking is continued. On the other hand, in a case where a degree of matching between an estimated inter-vehicle distance by communication L_com from other vehicle C3 that precedes the host vehicle C1, and the measured inter-vehicle distance by detection L_fr is relatively low, the tracking mode unit 14 is capable of determining that the other vehicle C2 captured by the front inter-vehicle distance sensor 21a is different from the other vehicle C3 that actually performs communication. In this case, the tracking mode unit 14 determines that the tracking is terminated.

In other words, the tracking mode unit 14 determines by using the motion information related to the other vehicle (other vehicle speed, other vehicle acceleration), which is based on the other vehicle communication information with relatively high reliability, whether "the same preceding vehicle identified as a communication vehicle in a previous control period exists at a position estimated in accordance with the motion information, also in a current control period". Consequently, the tracking mode unit 14 is capable of performing tracking continuation determination as to whether or not the same communication vehicle identified in the previous control period is continued to be identified.

Then, in a case where the tracking mode unit 14 determines that the tracking is continued, the tracking mode is maintained with no change. On the other hand, in a case where the tracking mode unit 14 determines that the tracking is terminated, the capturing mode unit 13 enters the capturing mode to return to the capturing mode.

With reference to a flowchart of FIG. 6, an example of the tracking determination process in the tracking mode performed by the vehicle control ECU 10 will now be described. These control routines are repeatedly performed in a control period of several hundred μs or several ten ms (the same applies hereinafter).

First, after the capturing mode unit 13 captures a communication vehicle in a capturing mode, the tracking mode unit 14 operates an estimated inter-vehicle distance by communication L_com, for example, by using the mathematical formula (1) (ST1). The tracking mode unit 14 adds a distance where the communication vehicle actually moves on the basis of communication data, namely motion information related to other vehicle communication information from the communication vehicle, to an estimated inter-vehicle distance previous value L_est, to operate the estimated inter-vehicle distance by communication L_com. Herein, the estimated inter-vehicle distance by communication L_com is an estimated inter-vehicle distance when it is assumed that the communication data (other vehicle communication information) is the data of the preceding vehicle captured by the inter-vehicle distance sensor 21a. In this case, in a case where the estimated inter-vehicle distance previous value [L_est] is an value in an initial control period in a tracking mode, a reference inter-vehicle distance between a host vehicle and a preceding vehicle at the time of capturing in the capturing mode is simply used with no change.

Next, the tracking mode unit 14 determines on the basis of the other vehicle detection information whether or not a radar preceding vehicle, namely, a preceding vehicle captured by the front inter-vehicle distance sensor 21a exists (ST2).

In a case where the tracking mode unit 14 determines the radar preceding vehicle exists (ST2: Yes), the tracking mode unit 14 computes a deviation between the estimated inter-vehicle distance by communication L_com computed in ST1, and the measured inter-vehicle distance by detection L_fr based on the other vehicle detection information, herein, an absolute value of the difference. Then, the tracking mode unit 14 determines whether or not a state where the absolute value of the difference is larger than a preset inter-vehicle distance threshold value L_th continues for a predetermined time T_th1 seconds that is preset or more (ST3). The inter-vehicle distance threshold value L_th is simply appropriately set in accordance with actual vehicle evaluation or the like. The predetermined time T_th1 is a preceding vehicle change determination time threshold value for determining the change of the preceding vehicle, and simply suitably set in accordance with actual vehicle evaluation or the like.

In a case where the tracking mode unit 14 determines the state where the absolute value of the difference is larger than the inter-vehicle distance threshold value L_th does not continue for the predetermined time T_th1 seconds or more (ST3: No), the tracking mode unit 14 identifies that other vehicle captured by the front inter-vehicle distance sensor 21a is a communication vehicle that actually communicates with the host vehicle. Then, the tracking mode unit 14 determines that the tracking is continued, to maintain the tracking mode with no change (ST4), and terminates the current control period, to transfer to a next control period.

In a case where the tracking mode unit 14 determines that the state where the absolute value of the difference is larger than the inter-vehicle distance threshold value L_th continues for the predetermined time T_th1 seconds or more (ST3: Yes), the tracking mode unit 14 determines that the other vehicle captured by the front inter-vehicle distance sensor 21a is different from the communication vehicle that actually communicates with the host vehicle. Then, the tracking mode unit 14 determines that the tracking is terminated, and the capturing mode unit 13 enters the capturing mode, to return to the capturing mode (ST5), and terminates the current control period, to transfer a next control period.

In a case where the tracking mode unit 14 determines that the radar preceding vehicle does not exist (ST2: No) in ST2 (ST2: No), the tracking mode unit 14 determines whether or not a continuation time during which the radar preceding vehicle does not exist continues for a predetermined time T_th2 seconds that is preset, or more (ST6). The predetermined time T_th2 is a preceding lost vehicle determination time threshold value for determining that the preceding vehicle is lost, and is simply appropriately set in accordance with actual vehicle evaluation or the like.

In a case where the tracking mode unit 14 determines that the continuation time during which the radar preceding vehicle does not exist does not continue the predetermined time T_th2 seconds or more (ST6: No), the tracking mode unit 14 transfers to ST4. On the other hand, in a case where determining whether or not the continuation time during which the radar preceding vehicle does not exist continues the predetermined time T_th2 seconds or more (ST6: Yes), the tracking mode unit 14 transfers to ST5

That is, in a case where the preceding vehicle momentarily deviates from the detection range R of the front inter-vehicle distance sensor 21a, the tracking mode unit 14 does not allow to immediately return to the capturing mode, but continues the tracking mode with no change in a case where the preceding vehicle returns in the detection range R again within a predetermined time, and the front inter-vehicle distance sensor 21a detects the preceding vehicle again. During this time, the tracking mode unit 14 continues to operate an estimated inter-vehicle distance by communication L_com in each control period. On the other hand, in a case where the preceding vehicle does not return in the detection range R again when the predetermined time or more elapses, the tracking mode unit 14 terminates the tracking mode to allow the mode to return to the capturing mode. Consequently, the vehicle control ECU 10 is capable of suppressing unnecessarily frequent switching between the tracking mode and the capturing mode, and suppressing occurrence of fluctuation in control.

The vehicle control system 1 configured as described above is capable of switching between the capturing mode and the tracking mode as a mode for identifying a communication vehicle, and identifies a communication vehicle by using the positional relation between other vehicle captured in the capturing mode and a host vehicle, and other vehicle motion information obtained by communication, at the time of the tracking mode. Therefore, the vehicle control system 1 is capable of successively acquiring communication vehicle motion information with relatively high reliability, on the basis of other vehicle communication information by the tracking mode, after once capturing a communication vehicle in the capturing mode, and identifying a communication vehicle on the basis of this communication vehicle motion information. Hence, it is possible to improve the accuracy in ID of a communication vehicle.

FIG. 7 is a diagrammatic graph representing an example of the action of the vehicle control system 1. In FIG. 7, the horizontal axis denotes a travel distance, and the vertical axes denote a relative lateral position of other vehicle with respect to a host vehicle, an inter-vehicle distance, and a communication preceding vehicle ID. Herein, for example, a case where two other vehicles C2 and C3 travel on adjacent lanes in parallel in front of a host vehicle C1, as illustrated in FIG. 8, will be described.

For example, the vehicle control system 1 captures the other vehicle C2 as a communication vehicle in the capturing mode at a point P1 before a point P2, at which a tunnel section starts, in the direction where the host vehicle C1 travels, and thereafter transfers to the tracking mode to continue vehicle ID by the tracking mode. Then, even when the host vehicle C1 passes the point P2 to enter the tunnel section, the vehicle control system 1 continues the tracking mode, and continues ID of a communication vehicle by using the positional relation between the other vehicle captured in the capturing mode and the host vehicle, and other vehicle motion information obtained by communication.

Herein, it is assumed that a vehicle control system according to a comparative example continues to identify a communication vehicle by GPS information in the tunnel section. In this case, for example, when the other vehicles C2 and C3 come to a curve in the tunnel section, the solid lines L11 and L12 representing an actual relative lateral position, and the dotted lines L11a and L12a representing a relative lateral position indicated by the GPS information are separated from each other. As a result, the vehicle control system according to the comparative example may incorrectly recognize the other vehicle C2 and the other vehicle C3 near the enclosure line A, and incorrectly detects a communication vehicle.

On the contrary, the vehicle control system 1 of this embodiment is capable of identifying a communication vehicle on the basis of the communication vehicle motion information with relatively high reliability by the tracking mode, after once capturing the communication vehicle in the capturing mode. Therefore, even when the host vehicle C1 enters the tunnel section, in the vehicle control system 1, the solid line L21 representing an estimated inter-vehicle distance between a host vehicle and other vehicle by communication, and a dotted line L22 representing a measured inter-vehicle distance between a host vehicle and other vehicle by detection almost match each other. Then, the solid line L31 indicating an actual communication preceding vehicle ID, and a dotted line L32 indicating a communication preceding vehicle ID identified by the tracking mode match each other, and the vehicle control system 1 is capable of accurately identifying a communication vehicle even in a tunnel section.

Accordingly, the vehicle control system 1 is capable of implementing ID of a communication vehicle with high accuracy in a wide scale, even under an environment where an error of a position by a GPS tents to relatively become large, for example, an urban area where tunnels or multi-paths frequently appear, or the like.

Additionally, for example, the vehicle control system 1 is capable of implementing ID of a communication vehicle with relatively high accuracy, compared to a case where ID of a communication vehicle is continued on the basis of time-series statistics of the preceding vehicle speed based on the other vehicle communication information and the preceding vehicle speed based the on other vehicle detection information.

For example, it is assumed that a vehicle control system according to a comparative example continues to identify a communication vehicle on the basis of the aforementioned time-series statistics. In this case, for example, in a case where a relatively large number of vehicles that travels at the same speed in an actual traffic environment such as a highway, when the vehicle control system according to the comparative example continues to identify a communication vehicle on the basis of the aforementioned time-series statistics, and another vehicle that travels at the same speed appears, a vehicle, to which the ID of a communication vehicle is performed, may be transferred to the aforementioned another vehicle. On the contrary, the vehicle control system according to the comparative example needs to strictly setting various determination threshold values so as not to cause the aforementioned transfer of an ID result, or needs to increase a target period of the time-series statistics. Consequently, a determination period of a communication vehicle may relatively increase, and an undetected state of a communication vehicle may increase.

However, the vehicle control system 1 of this embodiment is capable of identifying a communication vehicle on the basis of the communication vehicle motion information with relatively high reliability by the tracking mode after once capturing the communication vehicle in a capturing mode, and therefore is capable of accurately identifying a communication vehicle in a comparatively short determination period.

The vehicle control system 1 according to the embodiment described above includes the radio antenna 24a and the radio antenna control ECU 24 that receive the other vehicle communication information (other vehicle information) of the other vehicle around a host vehicle, the front inter-vehicle distance sensor 21a and the front sensor ECU 21 that detect other vehicle around the host vehicle, and the vehicle control ECU 10 that identifies a communication vehicle (transmitting vehicle) of the other vehicle communication information on the basis of the other vehicle communication information received by the radio antenna 24a and the radio antenna control ECU 24, and a result of detection by the front inter-vehicle distance sensor 21a and the front sensor ECU 21. The vehicle control ECU 10 is capable of switching between a capturing mode for capturing the communication vehicle on the basis of the other vehicle communication information received by the radio antenna 24a and the radio antenna control ECU 24, and the result of detection by the front inter-vehicle distance sensor 21a and the front sensor ECU 21, and a tracking mode for identifying the communication vehicle on the basis of the positional relation between the host vehicle and the communication vehicle at the time of capturing in a capturing mode, and motion information related to the communication vehicle, which is based on the other vehicle communication information received by the radio antenna 24a and the radio antenna control ECU 24, after the capturing in the capturing mode.

Therefore, the vehicle control system 1 and the vehicle control ECU 10 are each capable of identifying the communication vehicle on the basis of the communication vehicle motion information with relatively high reliability by the tracking mode, after once capturing the communication vehicle in the capturing mode. Hence, it is possible to improve environment resistance to secure so-called robustness, and it is possible to improve accuracy in ID of a communication vehicle.

Embodiment 2

Figure 9:
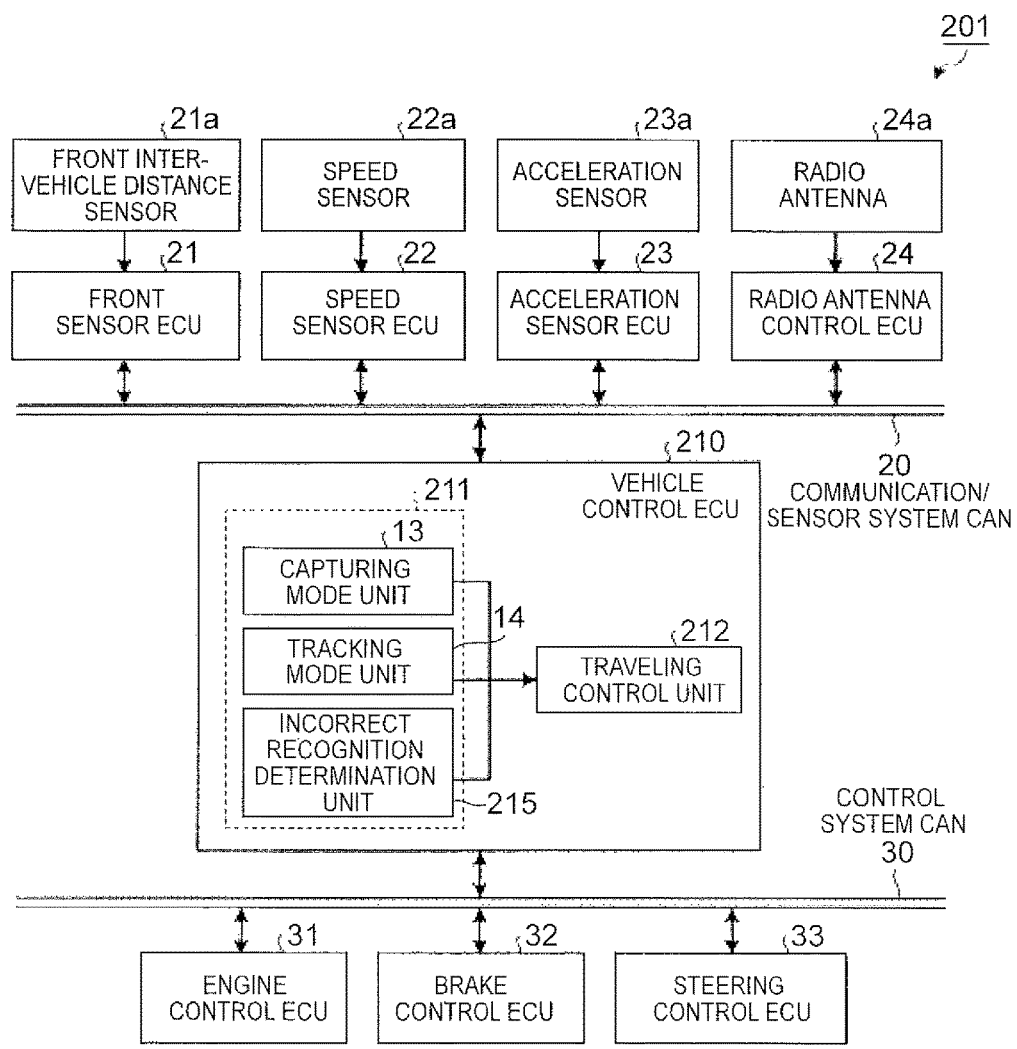
FIG. 9 is a schematic configuration diagram representing a vehicle control system according to Embodiment 2.
Figure 10:
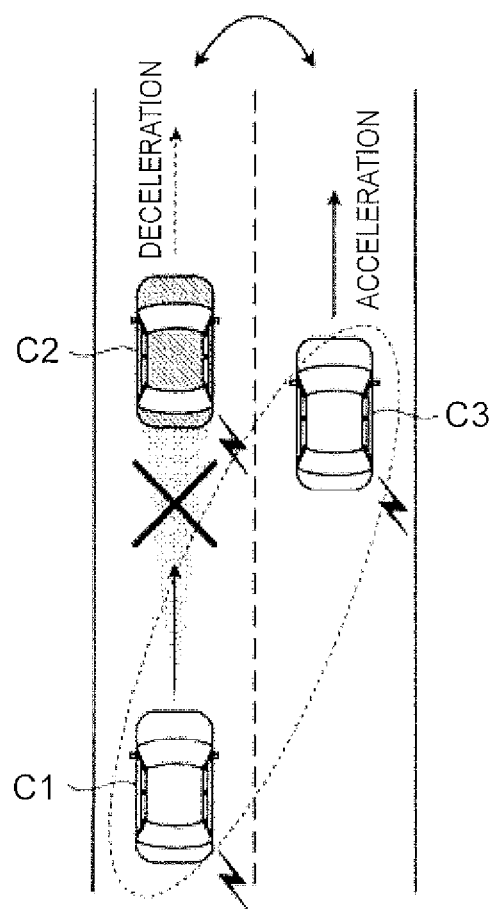
FIG. 10 is a schematic diagram illustrating incorrect recognition of a communication vehicle.
Figure 11:
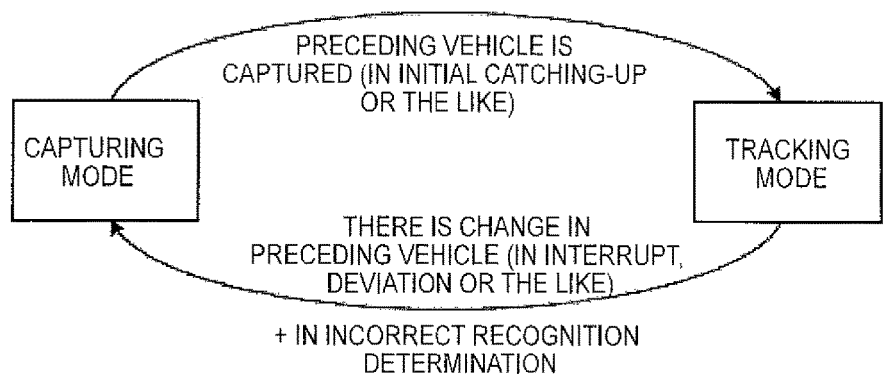
FIG. 11 is a schematic diagram illustrating an internal state of a vehicle control ECU according to Embodiment 2.
Figure 12:
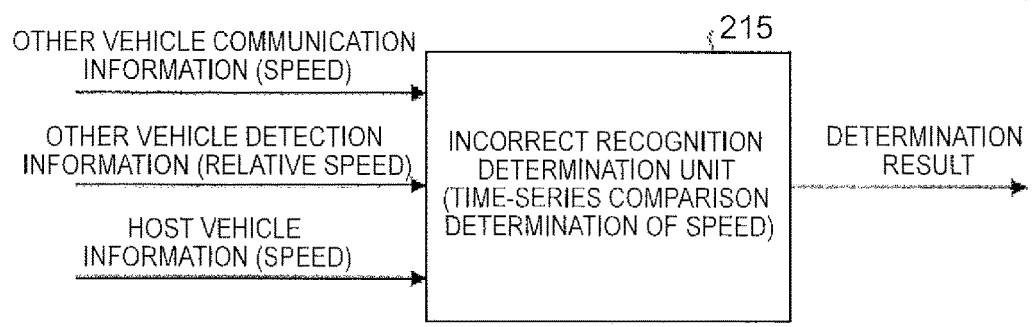
FIG. 12 is a schematic configuration diagram representing an incorrect recognition determination unit of the vehicle control ECU according to Embodiment 2.
Figure 13:
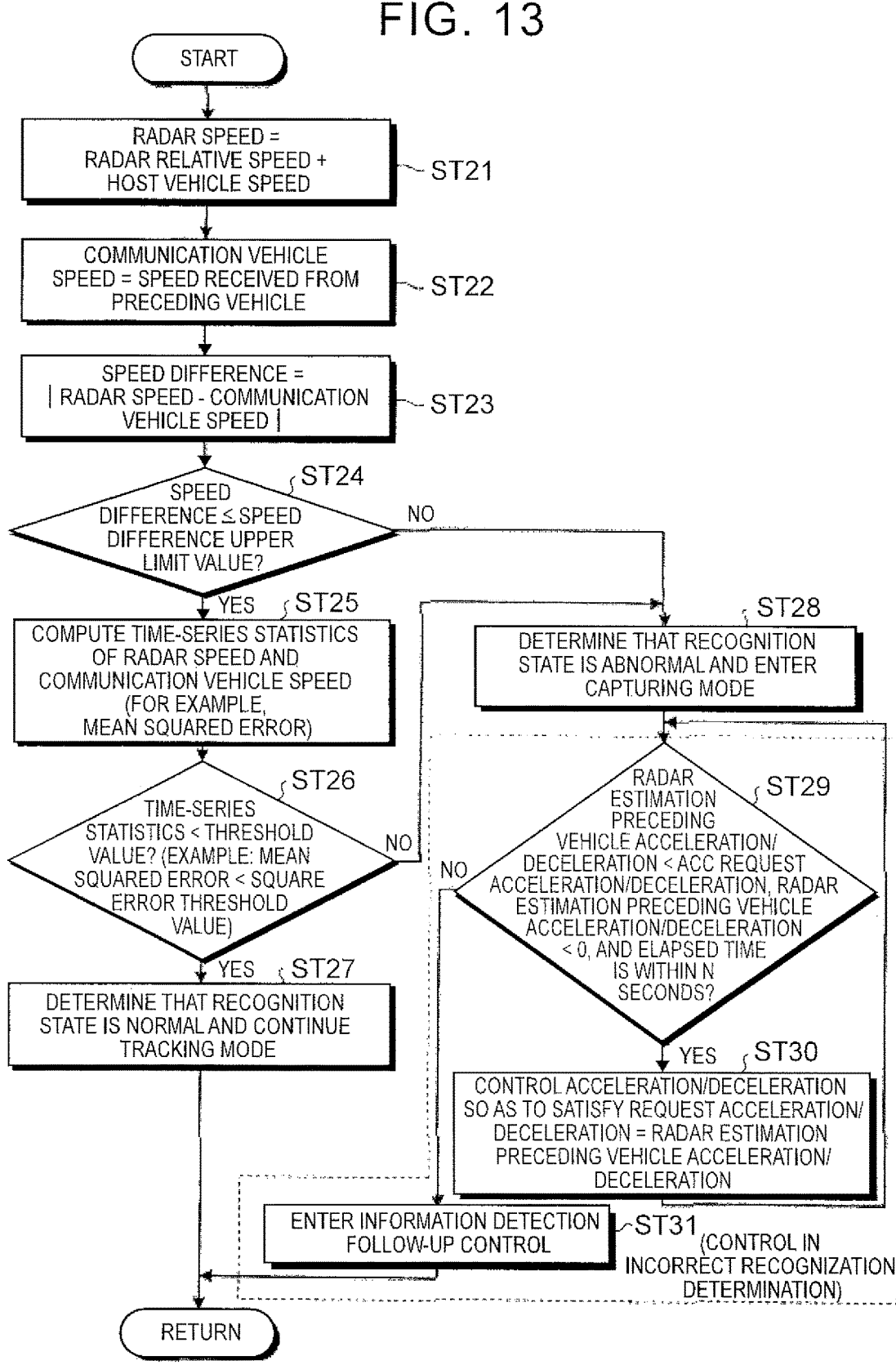
FIG. 13 is a flowchart illustrating an example of incorrect recognition determination control of the vehicle control ECU according to Embodiment 2.

FIG. 9 is a schematic configuration diagram representing a vehicle control system according to Embodiment 2, FIG. 10 is a schematic diagram illustrating incorrect recognition of a communication vehicle, FIG. 11 is a schematic diagram illustrating an internal state of a vehicle control ECU according to Embodiment 2, FIG. 12 is a schematic configuration diagram representing an incorrect recognition determination unit of the vehicle control ECU according to Embodiment 2, and FIG. 13 is a flowchart illustrating an example of incorrect recognition determination control in the vehicle control ECU according to Embodiment 2. A vehicle ID system, and a vehicle ID device according to Embodiment 2 are different from those of Embodiment 1 in that incorrect recognition determination is performed. In addition, redundant description for configurations, actins, and effects that are the same as those of the aforementioned embodiment will be omitted as much as possible.

A vehicle control system 201 serving as a vehicle ID system of this embodiment, shown in FIG. 9, includes a vehicle control ECU 210 that is used as a vehicle ID device and a traveling control device. In a functionally conceptual manner, the vehicle control ECU 210 is provided with a vehicle ID unit 211 and a traveling control unit 212. The vehicle ID unit 211 of this embodiment includes a capturing mode unit 13, a tracking mode unit 14, and an incorrect recognition determination unit 215.

The incorrect recognition determination unit 215 determines incorrect recognition of a communication vehicle in accordance with a result of comparison between motion information related to a communication vehicle, which is based on other vehicle communication information received by a radio antenna 24a and a radio antenna control ECU 24, and other vehicle detection information that is a result of detection by a front inter-vehicle distance sensor 21a and a front sensor ECU 21, in a tracking mode.

In the vehicle control ECU 210, after the capturing mode unit 13 once captures a communication vehicle in a capturing mode, the tracking mode unit 14 continues to identify the communication vehicle on the basis of the communication vehicle motion information with relatively high reliability, by a tracking mode.

Herein, for example, in the vehicle control ECU 210, as illustrated in FIG. 10, a case where the capturing mode unit 13 incorrectly recognizes other vehicle C3 that is different from other vehicle C2 captured by the front inter-vehicle distance sensor 21a, as a communication vehicle in a capturing mode, to capture the other vehicle C3 is assumed. In this case, in the vehicle control ECU 210, subsequent tracking determination, and ID of a communication vehicle in the tracking mode by the tracking mode unit 14 may be continued to be performed for an incorrect vehicle, thereby affecting subsequent follow-up control.

On the contrary, in the tracking mode, the incorrect recognition determination unit 215 simultaneously monitors a state by comparing the other vehicle detection information detected by the front inter-vehicle distance sensor 21a that is an autonomous sensor with the motion information related to the other vehicle communication information acquired via the radio antenna 24a, thereby suppressing continuation of incorrect ID of a communication vehicle.

As shown in FIG. 11, for example, the vehicle control ECU 210 adds incorrect recognition determination for a communication vehicle according to the result of comparison between the communication vehicle motion information based on the other vehicle communication information and the other vehicle detection information by the incorrect recognition determination unit 215, as a return condition from the tracking mode to the capturing mode. In a case where the incorrect recognition determination unit 215 determines the incorrect recognition for a communication vehicle in the tracking mode, the tracking mode unit 14 determines that the tracking is terminated, and the capturing mode unit 13 enters the capturing mode to return to the capturing mode.

More specifically, as illustrated in FIG. 12, other vehicle communication information including other vehicle motion information indicating the speed of other vehicle, and other vehicle detection information indicating a relative speed between the host vehicle and a preceding vehicle, and host vehicle information indicating the speed of the host vehicle are input to the incorrect recognition determination unit 215. The incorrect recognition determination unit 215 determines incorrect recognition, herein, time-series comparison of the speed, on the basis of these other vehicle communication information, other vehicle detection information, and host vehicle information, to output result of the determination.

The incorrect recognition determination unit 215 computes time-series statistics of a preceding vehicle speed (or relative speed of the preceding vehicle to the host vehicle) based on the other vehicle communication information, and a preceding vehicle speed (or relative speed of the preceding vehicle to the host vehicle) based on the other vehicle detection information, for example, by using a mean squared error or a correction coefficient, a differential integration value, or the like. The time-series statistics of speed corresponds to the result of comparison between the communication vehicle motion information based on the other vehicle communication information, and the other vehicle detection information. As an example, the incorrect recognition determination unit 215 computes a mean squared error between the preceding vehicle speed based on the other vehicle communication information and the preceding vehicle speed based on the other vehicle detection information, as time-series statistics, for example, by using the following mathematical formula (2). In this case, the incorrect recognition determination unit 215 is capable of computing the preceding vehicle speed based on the other vehicle detection information, for example, by adding the host vehicle speed to the relative speed of the preceding vehicle, which is based on the other vehicle detection information.

[Math. 2]

$$Xrms = \sqrt{\frac{1}{N}\sum_{i=1}^{N} x_i^2} \qquad (2)$$

In the aforementioned mathematical formula (2), [Xrms] denotes a mean squared error between the preceding vehicle speed based on the other vehicle communication information and the preceding vehicle speed based on the other vehicle detection information, and [xi] denotes a difference between the preceding vehicle speed based on the other vehicle detection information and the preceding vehicle speed based on the other vehicle communication information.

The incorrect recognition determination unit 215 determines on the basis of the mean square error Xrms as the time-series statistics whether or not a preceding vehicle captured by the front inter-vehicle distance sensor 21a is a communication vehicle that actually communicates with the host vehicle, in the tracking mode, namely, determines incorrect recognition for a communication vehicle, to output a result of the determination. In a case where the mean squared error Xrms is a preset square error threshold value or more, the incorrect recognition determination unit 215 determines that the communication vehicle is incorrectly recognized. The square error threshold value is appropriately set in accordance with actual vehicle evaluation.

Then, in a case where the result of the incorrect recognition determination by the incorrect recognition determination unit 215 reveals that no incorrect recognition occurs, the tracking mode unit 14 maintains the tracking mode with no change. In a case where the result of the incorrect recognition determination by the incorrect recognition determination unit 215 reveals that incorrect recognition occurs, the tracking mode unit 14 terminates the tracking, and the capturing mode unit 13 enters the capturing mode to return the capturing mode.

Therefore, even in a case where the capturing mode unit 13 recognizes and captures an incorrect communication vehicle in the capturing mode, when the speed of a communication vehicle that is incorrectly recognized, and the speed of a preceding vehicle that travels immediately in front of a host vehicle become different, the vehicle control system 201 is capable of speedily detecting discrepancy of motion of the both vehicles. Consequently, the vehicle control system 201 is capable of speedily determining incorrect recognition for a communication vehicle. As a result, in a case where the incorrect recognition for a communication vehicle is detected, the vehicle control system 201 is capable of quickly returning to the capturing mode. Accordingly, the vehicle control system 201 is capable of suppressing continuation of subsequent communication vehicle ID for an incorrect vehicle in the tracking mode by the tracking mode unit 14. Consequently, the vehicle control system 201 is capable of inhibiting the incorrect recognition for a communication vehicle from affecting subsequent follow-up control.

Then, the traveling control unit 212 of this embodiment controls the host vehicle on the basis of the result of the incorrect recognition determination by the incorrect recognition determination unit 215. Specifically, at the time of returning from the tracking mode to the capturing mode in accordance with the result of comparison between the communication vehicle motion information based on the other vehicle communication information and the other vehicle detection information, in other words, the mean squared error Xrms as the time-series statistics, the traveling control unit 212 controls the deceleration of the host vehicle on the basis of the deceleration of the other vehicle indicated by the other vehicle detection information. That is, when the incorrect recognition determination unit 215 detects incorrect recognition for a communication vehicle, the traveling control unit 212 controls the deceleration of the host vehicle on the basis of the deceleration of the other vehicle indicated by the other vehicle detection information. In this case, the traveling control unit 212 generates acceleration request value information such that the deceleration of the host vehicle is equal to the deceleration of the other vehicle, which is based on the other vehicle detection information, to output the acceleration request value information to an engine control ECU 31 and the like. In this case, for example, the traveling control unit 212 differentiates the other vehicle speed based on the other vehicle detection information, which is computed by the incorrect recognition determination unit 215, thereby enabling computation of the other vehicle acceleration/deceleration based on the other vehicle detection information.

In this case, for example, as illustrated in FIG. 10, in a case where the capturing mode unit 13 incorrectly recognizes the other vehicle C3 that is different from the other vehicle C2 captured by the front inter-vehicle distance sensor 21*a*, as a communication vehicle in the capturing mode, and captures the other vehicle C3, the vehicle control system 201 is capable of controlling such that the deceleration of the host vehicle C1 is equal to the actual deceleration of the other vehicle C2. Therefore, even in a case where the communication vehicle is incorrectly recognized, when the speed of the other vehicle C3 that is incorrectly recognized and the speed of the other vehicle C2 that travels immediately in front of the host vehicle become different, the vehicle control system 201 implements control such that the host vehicle C1 decelerates in conjunction with the deceleration of the other vehicle C2 without being tempted to follow the acceleration of the other vehicle C3. Therefore, the vehicle control system 201 is capable of suitably securing an inter-vehicle distance between the host vehicle C1 and the other vehicle C2 that travels immediately in front of the host vehicle C1. Thereafter, the vehicle control system 201 is capable of suitably transferring, for example, to information detection follow-up control that does not use the other vehicle information received by radio communication, after the inter-vehicle distance between the host vehicle C1 and the other vehicle C2 is sufficiently secured.

With reference to a flowchart of FIG. 13, an example of incorrect recognition determination control performed by the vehicle control ECU 210 will be described.

When a mode for identifying a communication vehicle is transferred from a capturing mode to a tracking mode, the incorrect recognition determination unit 215 computes the radar speed, namely, the speed of a preceding vehicle captured by the front inter-vehicle distance sensor 21*a* (ST21). For example, the incorrect recognition determination unit 215 computes the radar speed of the preceding vehicle, which is based on the other vehicle detection information by adding the host vehicle speed, namely, the host vehicle speed based on the host vehicle information to the radar relative speed, namely, the relative speed of the preceding vehicle, which is based on the other vehicle detection information.

The incorrect recognition determination unit 215 acquires the communication vehicle speed, namely, the speed received from a preceding vehicle currently identified as a communication vehicle, on the basis of other vehicle communication information (ST22).

The incorrect recognition determination unit 215 computes an absolute value of a difference between the radar speed computed in ST21 and the communication vehicle speed computed in ST22, thereby computing a speed difference (ST23).

The incorrect recognition determination unit 215 determines whether or not the speed difference computed in ST23 is a preset speed difference upper limit value or more (ST24). The speed difference upper limit value is simply appropriately set in accordance with actual vehicle evaluation or the like.

In a case where the incorrect recognition determination unit 215 determines that the speed difference is the speed difference upper limit value or less (ST24: Yes), the incorrect recognition determination unit 215 operates the time-series statistics of the radar speed computed in ST21 and the communication vehicle speed computed in ST22 (ST25). Herein, the incorrect recognition determination unit 215 computes, for example, a mean squared error between the radar speed and the communication vehicle speed by using the aforementioned mathematical formula (2), as the time-series statistics.

Then, the incorrect recognition determination unit 215 determines whether or not the time-series statistics computed in ST25 is smaller than a preset threshold value, herein, whether or not the mean squared error is smaller than a preset square error threshold value (ST26).

In a case where the incorrect recognition determination unit 215 determines that the mean squared error is smaller than the square error threshold value (ST26: Yes), the incorrect recognition determination unit 215 determines that a communication vehicle recognition state is normal, and the tracking mode unit 14 continues the tracking mode (ST27), terminates a current control period, and transfers to a next control period.

In a case where the incorrect recognition determination unit 215 determines that the speed difference is larger than the speed difference upper limit value in ST24 (ST24: No), in a case where the incorrect recognition determination unit 215 determines that the mean squared error is the square error threshold value or more in ST26 (ST26: No), the incorrect recognition determination unit 215 determines that the communication vehicle recognition state is abnormal, namely, the communication vehicle is incorrectly recognized. Then, the tracking mode unit 14 terminates the tracking mode, and the capturing mode unit 13 enters the capturing mode, to return to the capturing mode (ST28).

The traveling control unit 212 determines whether or not a radar estimation preceding vehicle acceleration/deceleration is smaller than an ACC request acceleration/deceleration, whether or not this radar estimation preceding vehicle acceleration/deceleration is smaller than 0, and whether or not an elapsed time from detection of incorrect recognition for a communication vehicle is within preset N seconds (ST29). The traveling control unit 212 differentiates the radar speed computed in ST21, thereby enabling computation of the radar estimation preceding vehicle acceleration/deceleration. The ACC request acceleration/deceleration is the acceleration/deceleration required in accordance with a target vehicle acceleration (target vehicle deceleration) in information detection follow-up control that does not use other vehicle information by radio communication. The present N seconds is simply appropriately set as time during which a sufficient inter-vehicle distance can be secured when the host vehicle is decelerated matching the preceding vehicle in accordance with actual vehicle evaluation or the like.

In a case where the traveling control unit 212 determines that the radar estimation preceding vehicle acceleration/deceleration is smaller than the ACC request acceleration/deceleration, this radar estimation preceding vehicle acceleration/deceleration is smaller than 0, and the elapsed time from detection of incorrect recognition for a communication vehicle is within the preset N seconds (ST29: Yes), the traveling control unit 212 sets a request acceleration/deceleration requested to the host vehicle as the radar estimation preceding vehicle acceleration/deceleration. Then, the traveling control unit 212 controls the acceleration/deceleration of the host vehicle on the basis of the set request acceleration/deceleration (ST30), and thereafter returns to ST29 to repeatedly perform subsequent processes.

In a case where the traveling control unit 212 determines that the radar estimation preceding vehicle acceleration/deceleration is the ACC request acceleration/deceleration or more, in a case where the traveling control unit 212 determines that the radar estimation preceding vehicle acceleration/deceleration is 0 or more, or in a case where the traveling control unit 212 determines that the elapsed time from the detection of the incorrect recognition for a communication vehicle exceeds. N seconds (ST29: No), the traveling control unit 212 enters information detection follow-up control (ST31), terminates a current control period, and transfers to a next control period. The traveling control unit 212 is in a state where an inter-vehicle distance can be suitably secured, even when performing the information detection follow-up control, and therefore there is no problem even when the traveling control unit 212 transfers from information communication follow-up control to information detection follow-up control.

The processes in ST29 to ST31 described above correspond to control in incorrect recognition determination performed by the traveling control unit 212 when the incorrect recognition determination unit 215 detects incorrect recognition for a communication vehicle. In a case where a correction coefficient between the radar speed and the communication vehicle speed is operated as the time-series statistics in ST25, the incorrect recognition determination unit 215 determines whether or not the correction coefficient is larger than a preset correction coefficient threshold value in ST26. In this case, in a case where the incorrect recognition determination unit 215 determines that the correction coefficient is larger than the correction coefficient threshold value (ST26: Yes), the process advances to ST27. When it is determined that the correction coefficient is the correction coefficient threshold value or less (ST26: No), the process advances to ST28.

The vehicle control system 201 and the vehicle control ECU 210 according to the embodiment described above are each capable of identifying a communication vehicle on the basis of the communication vehicle motion information with relatively high reliability by the tracking mode, after once capturing the communication vehicle in the capturing mode. Hence, it is possible to improve environment resistance to secure so-called robustness, and it is possible to improve accuracy in ID of the communication vehicle.

Furthermore, according to the vehicle control system 201 according to the embodiment described above, the vehicle control ECU 210 returns to a capturing mode in accordance with the result of the comparison between the communication vehicle motion information based on the other vehicle communication information received by the radio antenna 24a and the radio antenna control ECU 24 and the result of the detection by the front inter-vehicle distance sensor 21a and the front sensor ECU 21, in the tracking mode.

Therefore, even in a case where the vehicle control system 201 and the vehicle control ECU 210 recognize and capture an incorrect communication vehicle in the capturing mode, the vehicle control system 201 and the vehicle control ECU 210 are capable of speedily detecting discrepancy of motion of the communication vehicle incorrectly recognized and other vehicle that travels immediately in front of a host vehicle, and quickly returning to the capturing mode. Consequently, the vehicle control system 201 and the vehicle control ECU 210 are capable of suppressing continuation of subsequent communication vehicle ID for an incorrect vehicle in the tracking mode, and inhibiting the incorrect recognition for a communication vehicle from affecting subsequent follow-up control.

Furthermore, the vehicle control system 201 according to the embodiment described above includes the vehicle control ECU 210 that serves as a traveling control device for controlling the deceleration of a host vehicle on the basis of the deceleration of other vehicle detected by the front inter-vehicle distance sensor 21a and the front sensor ECU 21 when returning from the tracking mode to the capturing mode in accordance with the result of the comparison between the communication vehicle motion information based on the other vehicle communication information received by the radio antenna 24a and the radio antenna control ECU 24 and the result of the detection by the front inter-vehicle distance sensor 21a and the front sensor ECU 21.

Therefore, even in a case where other vehicle that is different from other vehicle captured by the front inter-vehicle distance sensor 21a in the capturing mode is incorrectly captured as a communication vehicle, the vehicle control system 201 and the vehicle control ECU 210 are capable of suitably securing the inter-vehicle distance between the host vehicle and the other vehicle that travels immediately in front of the host vehicle.

The vehicle ID system and the vehicle ID device according to each of the aforementioned embodiment of the invention are not limited to the aforementioned embodiments, and can be changed in various manners within the scope described in the scope of claims. The vehicle ID system and the vehicle ID device according to this embodiment may be configured by appropriately combining components of each of the embodiments described above.

The vehicle ID system described above is applied to a vehicle control system that is a follow-up control system, but the invention is not limited to this. In the above description, the vehicle ID device and the traveling control device are used by the vehicle control ECU 10 or 210. However, the invention is not limited to this. For example, the vehicle ID device and the traveling control device may be configured independently from the vehicle control ECU 10 or 210, and may mutually transfer a detection signal or a drive signal, or information such as a control command.

- 1, 201 vehicle control system
- 10, 210 vehicle control ECU (vehicle ID device)
- 11, 211 vehicle 1D unit
- 12, 212 traveling control unit
- 13 capturing mode unit
- 14 tracking mode unit
- 20 communication/sensor system CAN
- 21 front sensor ECU (detection device)
- 21*a* front inter-vehicle distance sensor (detection device)
- 24 radio antenna control ECU (communication device)
- 24*a* radio antenna (communication device)
- 30 control system CAN
- 31 engine control ECU
- 32 brake control ECU
- 33 steering control ECU
- 215 incorrect recognition determination unit
- c1 host vehicle
- c2, c3 other vehicle

The invention claimed is:

1. A vehicle identification system comprising:
a communication device that receives other vehicle information related to an other vehicle around a host vehicle;
a detection device that detects the other vehicle around the host vehicle; and
a vehicle identification device that identifies a transmitting vehicle transmitting the other vehicle information on the basis of the other vehicle information received by the communication device and a result of detection by the detection device, the vehicle identification device being configured to:
perform a capturing mode for capturing the transmitting vehicle on the basis of the other vehicle information received by the communication device and the result of detection by the detection device, and
perform a tracking mode for identifying the transmitting vehicle on the basis of relative position information that is related to the transmitting vehicle based on: (i) a positional relation between the host vehicle and the transmitting vehicle at the time of capturing in the capturing mode, and (ii) motion information related to the transmitting vehicle based on the other vehicle information received by the communication device, wherein:
the vehicle identification device performs only one of the capturing mode or the tracking mode at a given time, and
the vehicle identification device switches from the capturing mode to the tracking mode when the transmitting vehicle is captured in the capturing mode, and the vehicle identification device switches from the tracking mode to the capturing mode when a change in the transmitting vehicle occurs.

2. The vehicle identification system according to claim 1, wherein
the vehicle identification device captures the transmitting vehicle on the basis of absolute position information that is position information related to the transmitting vehicle based on the other vehicle information in the capturing mode, and identifies, in the tracking mode, the transmitting vehicle on the basis of the relative position information based on a reference position that is a position of the transmitting vehicle at the time of capturing in the capturing mode, and the motion information related to the transmitting vehicle.

3. The vehicle identification system according to claim 2, wherein
the vehicle identification device identifies, in the tracking mode, the transmitting vehicle on the basis of the relative position information based on the relative position information in the past in the tracking mode, and the motion information related to the transmitting vehicle.

4. The vehicle identification system according to claim 1, wherein
the vehicle identification device returns, in the tracking mode, to the capturing mode in accordance with a result of comparison between the motion information related to the transmitting vehicle based on the other vehicle information received by the communication device, and the result of detection by the detection device.

5. The vehicle identification system according to claim 4, further comprising
a traveling control device that controls deceleration of the host vehicle on the basis of deceleration of the other vehicle detected by the detection device, at the time of returning from the tracking mode to the capturing mode in accordance with the result of comparison.

6. The vehicle identification system according to claim 1, wherein the change in the transmitting vehicle corresponds to a deviation or interrupt of identifying the transmitting vehicle during the tracking mode.

7. A vehicle identification device for use with a host vehicle, the vehicle identification device comprising:
a communication device;
a detector configured to detect at least one other vehicle around the host vehicle; and
an electronic control unit programmed to:
perform a capturing mode for capturing a transmitting vehicle transmitting other vehicle information related to the at least one other vehicle around the host vehicle received by the communication device by receiving the captured other vehicle information and detecting a presence of at least one other vehicle by the detector, and
perform a tracking mode for identifying the transmitting vehicle on the basis of relative position information that is related to the transmitting vehicle based on: (i) a positional relation between the host vehicle and the transmitting vehicle at the time of capturing in the capturing mode, and (ii) motion information related to the transmitting vehicle based on the other vehicle information received by the communication device, wherein:
the electronic control unit performs only one of the capturing mode or the tracking mode at a given time, and
the electronic control unit switches from the capturing mode to the tracking mode when the transmitting vehicle is captured in the capturing mode, and the electronic control unit switches from the tracking mode to the capturing mode when a change in the transmitting vehicle occurs.

8. The vehicle identification device according to claim 7, wherein the change in the transmitting vehicle corresponds to a deviation or interrupt of identifying the transmitting vehicle during the tracking mode.

9. A vehicle identification system for use with a host vehicle, the vehicle identification system comprising:

a radio antenna configured to receive other vehicle information related to at least one other vehicle around the host vehicle;

a sensor configured to detect at least one other vehicle around the host vehicle; and an electronic control unit programmed to:
- identify a transmitting vehicle transmitting the other vehicle information on the basis of the other vehicle information received by the radio antenna and a result of detection by the sensor, and
- perform a capturing mode for capturing the transmitting vehicle on the basis of the other vehicle information received by the radio antenna and the result of detection by the sensor, and
- perform a tracking mode for identifying the transmitting vehicle on the basis of relative position information that is related to the transmitting vehicle based on: (i) a positional relation between the host vehicle and the transmitting vehicle at the time of capturing in the capturing mode, and (ii) motion information related to the transmitting vehicle based on the other vehicle information received by the radio antenna, wherein:
- the electronic control unit performs only one of the capturing mode or the tracking mode at a given time, and
- the electronic control unit switches from the capturing mode to the tracking mode when the transmitting vehicle is captured in the capturing mode, and the electronic control unit switches from the tracking mode to the capturing mode when a change in the transmitting vehicle occurs.

10. The vehicle identification system according to claim 9, wherein
the electronic control unit captures the transmitting vehicle on the basis of absolute position information that is position information related to the transmitting vehicle based on the other vehicle information in the capturing mode, and identifies, in the tracking mode, the transmitting vehicle on the basis of the relative position information based on a reference position that is a position of the transmitting vehicle at the time of capturing in the capturing mode, and the motion information related to the transmitting vehicle.

11. The vehicle identification system according to claim 10, wherein
the electronic control unit identifies, in the tracking mode, the transmitting vehicle on the basis of the relative position information based on the relative position information in the past in the tracking mode, and the motion information related to the transmitting vehicle.

12. The vehicle identification system according to claim 9, wherein
the electronic control unit returns, in the tracking mode, to the capturing mode in accordance with a result of comparison between the motion information related to the transmitting vehicle based on the other vehicle information received by the radio antenna, and the result of detection by the sensor.

13. The vehicle identification system according to claim 12, wherein the electronic control unit is programmed to:
control a deceleration of the host vehicle on the basis of deceleration of the other vehicle detected by the sensor, at the time of returning from the tracking mode to the capturing mode in accordance with the result of comparison.

14. The vehicle identification system according to claim 9, wherein the change in the transmitting vehicle corresponds to a deviation or interrupt of identifying the transmitting vehicle during the tracking mode.

* * * * *